(12) United States Patent
Hirai et al.

(10) Patent No.: US 6,510,284 B2
(45) Date of Patent: Jan. 21, 2003

(54) PHOTOMETRY DEVICE FOR A CAMERA INCLUDING EXTERNAL LIGHT SENSOR

(75) Inventors: Isamu Hirai, Tokyo (JP); Yoshikazu Iida, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/771,582

(22) Filed: Jan. 30, 2001

(65) Prior Publication Data

US 2001/0010762 A1 Aug. 2, 2001

(30) Foreign Application Priority Data

Jan. 31, 2000 (JP) ............................. 2000-022230
Aug. 3, 2000 (JP) ............................. 2000-235355

(51) Int. Cl.[7] .......................... G03B 7/00; G03B 13/26
(52) U.S. Cl. .................... 396/121; 396/225; 396/234
(58) Field of Search ....................... 396/65, 67, 121, 396/122, 123, 225, 233, 234

(56) References Cited

U.S. PATENT DOCUMENTS

| 5,471,276 A | 11/1995 | Hirai et al. |
| 5,596,387 A | 1/1997 | Takagi |
| 5,617,175 A * | 4/1997 | Asakura et al. ............. 396/166 |
| 5,710,948 A | 1/1998 | Takagi |
| 5,987,265 A | 11/1999 | Iwasaki |
| 6,081,669 A | 6/2000 | Kosako |
| 6,175,693 B1 * | 1/2001 | Iida ............................. 396/121 |

FOREIGN PATENT DOCUMENTS

| JP | 6-281994 | 10/1994 |
| JP | 7-84299 | 3/1995 |
| JP | 2634897 | 4/1997 |
| JP | 9-54651 | 9/1998 |

* cited by examiner

Primary Examiner—Alan A. Mathews
Assistant Examiner—Arthur A Smith
(74) Attorney, Agent, or Firm—Greenblum & Bernstein, P.L.C

(57) ABSTRACT

A photometry device for a camera is provided with a normal light sensor having spectral sensitivity characteristics close to visual sensitivity characteristics, a plurality of colorimetric sensors having spectral sensitivity characteristics that are different from those of the normal light sensor, an exposure amount determining system that determines an exposure amount of an object in accordance with an output of the normal light sensor. A color of the object is determined in accordance with the outputs of the plurality of colorimetric sensors and an external light sensor that measures an external light illuminating the object at spectral sensitivity characteristics corresponding to each of the plurality of colorimetric sensors. Then, based on the determined color, an exposure compensation amount is determined.

15 Claims, 21 Drawing Sheets

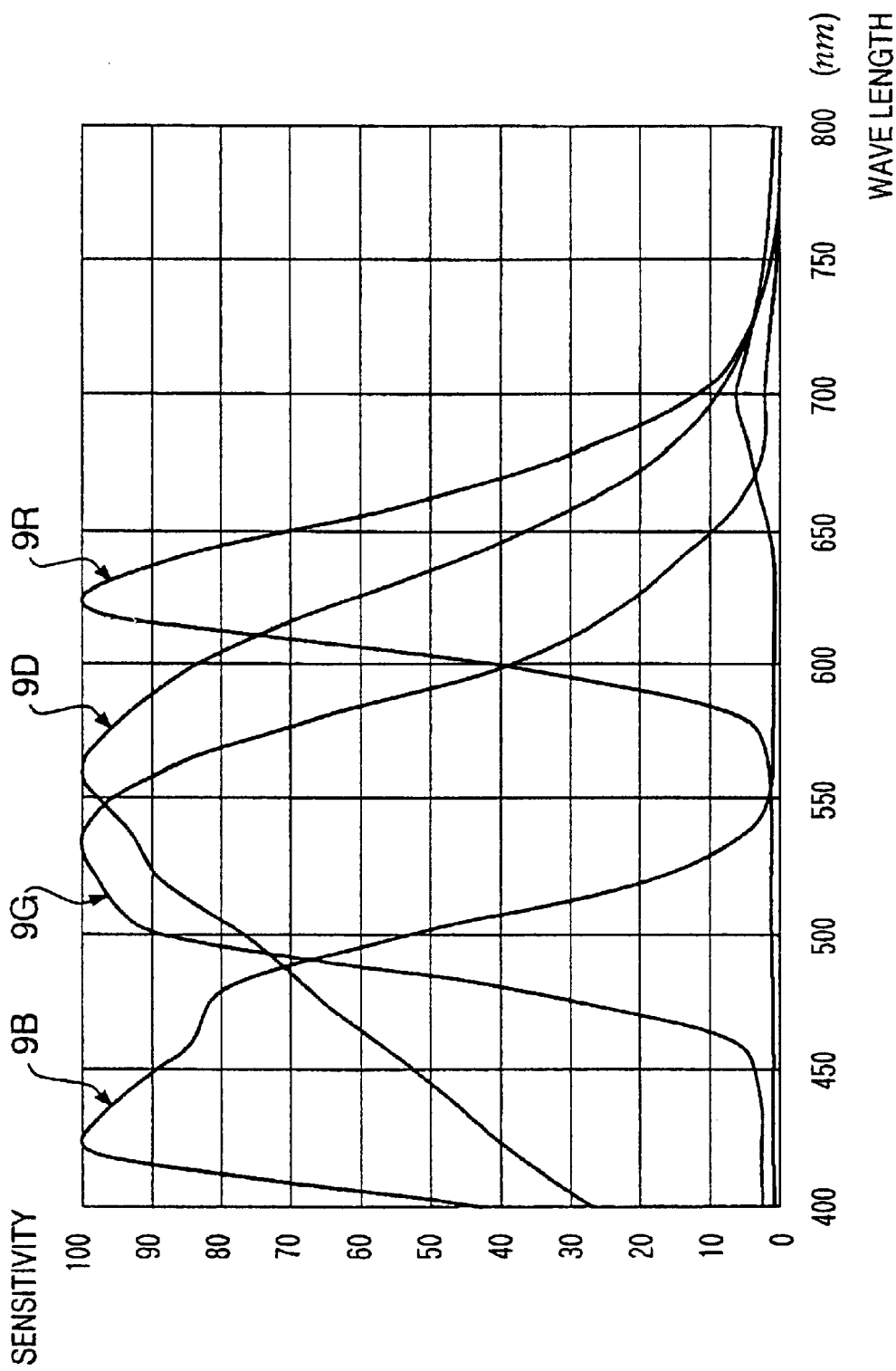

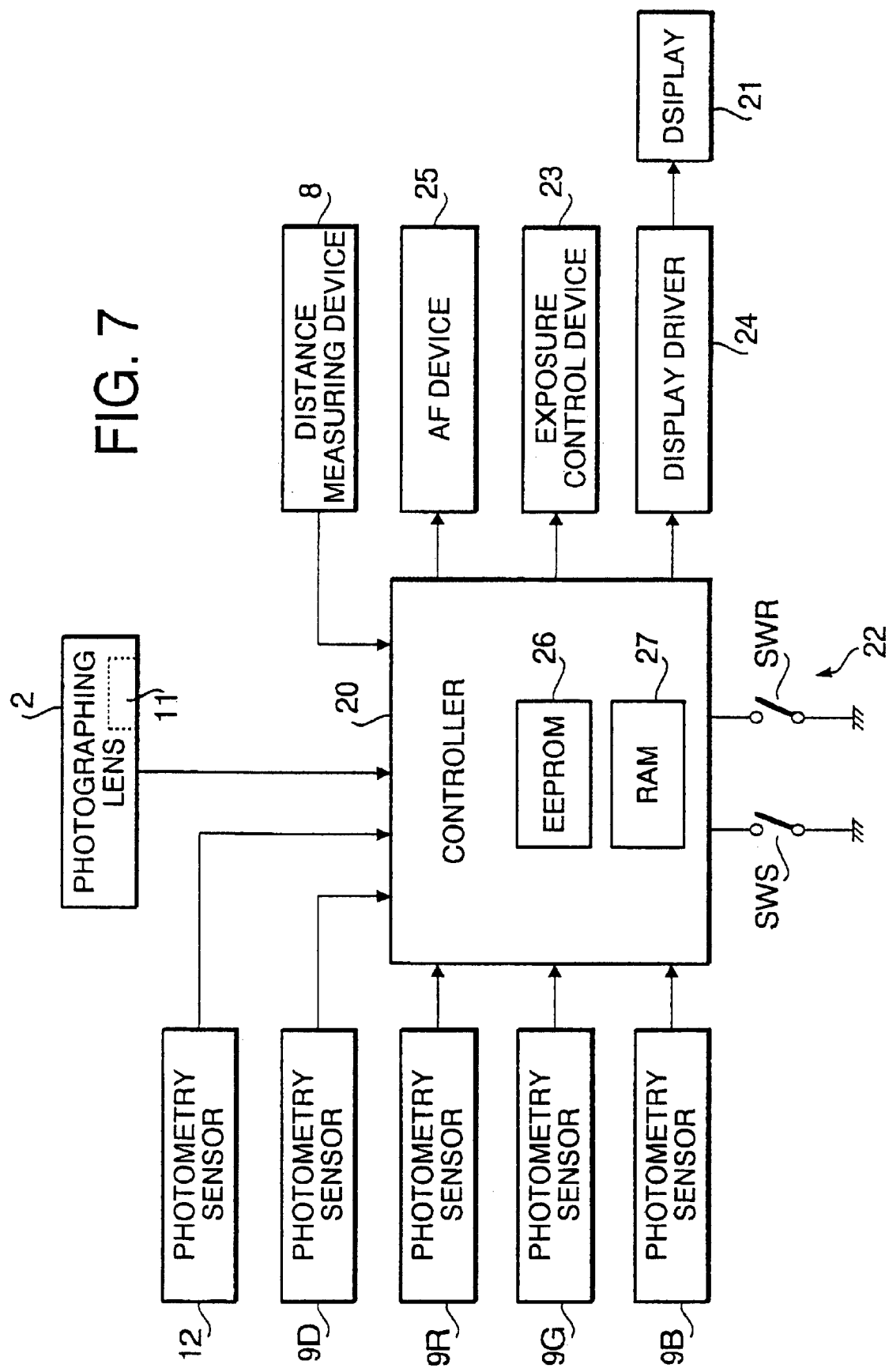

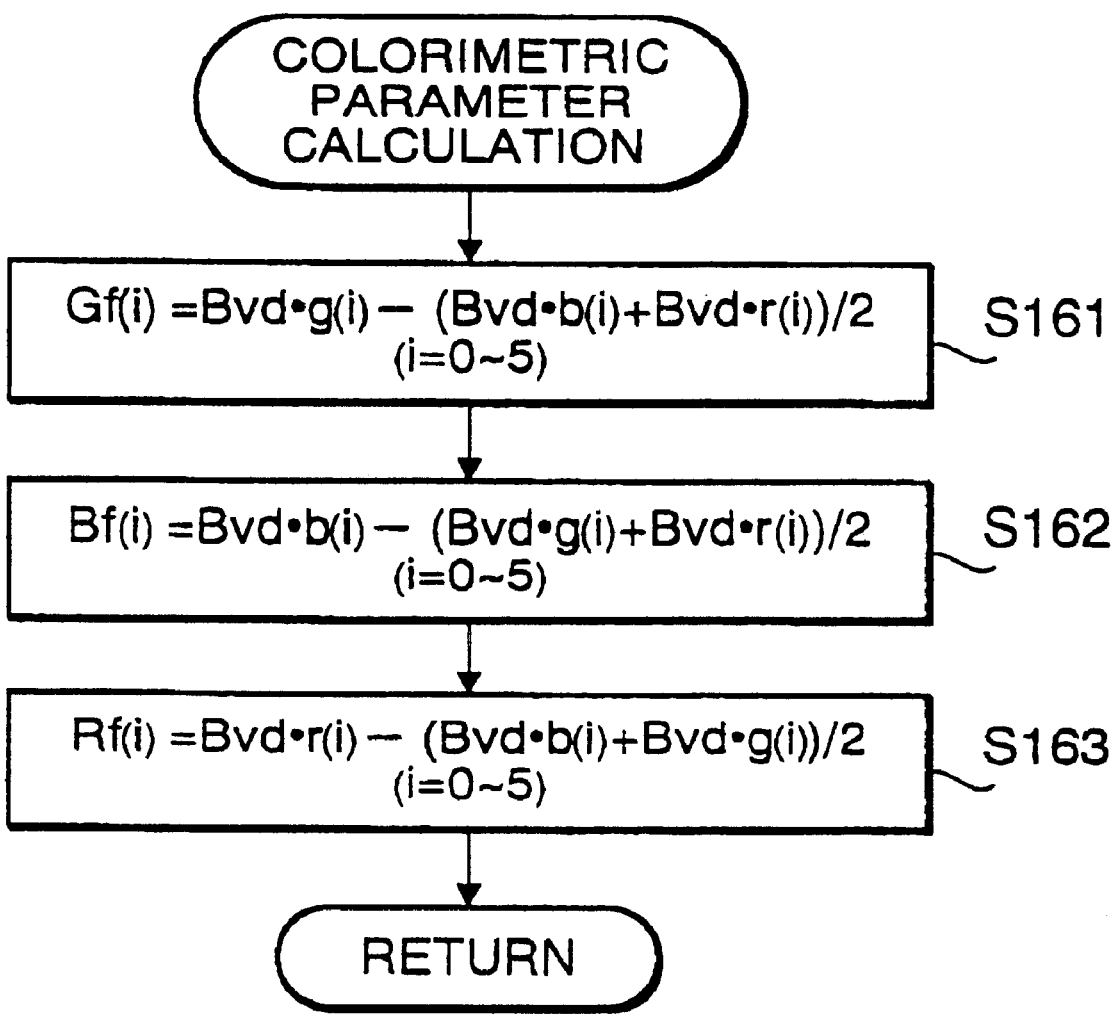

(EEPROM)

|  |  | THvalue | coefficient | CCcoefficient | CCadjustment |
|---|---|---|---|---|---|
| GREEN | g1 | 8 | 3/4 | 0 | 0 |
|  | g2 |  | 3/4 |  |  |
| BLUE | b1 | 8 | 3/4 | 2/16 | 2 |
|  | b2 |  | 3/4 |  |  |
| RED | r1 | 15 | 3/4 | 1/16 | 2 |
|  | r2 |  | 3/4 |  |  |
| MAGENTA | m1 | −40 |  | 0 | 0 |
| YELLOW | y1 | −9 |  | 1 | −4 |
| CYAN | c1 | −40 |  | 0 | 0 |

FIG.19

PHOTOMETRY DEVICE FOR A CAMERA INCLUDING EXTERNAL LIGHT SENSOR

BACKGROUND OF THE INVENTION

The present invention relates to a photometry device applicable to an SLR (Single Lens Reflex) camera, and more particularly to a photometry device with which exposure errors due to a difference of reflectivity of objects having different colors can be compensated.

Recently, in most of cameras, reflection type photometry devices are employed. The reflection type photometry device receives the light, which is reflected by an object and passed through an observing optical system of a camera, using a light receiving element, determines the brightness of the object based on the output of the measured value, and then calculates the exposure value of the camera based on the measured brightness. However, this type of the photometry device cannot detect the color of the object because of its structure. Accordingly, in such a device, the reflectivity of an object is generally assumed to be 18% and the exposure parameter is determined on this assumption. Therefore, regarding a whitish object whose reflectivity is greater than 18%, the determined brightness is greater than the actual brightness. If the camera controls an exposure operation based on thus determined exposure value, the object is under exposed. A dark object whose reflectivity is less than 18% is measured to have a lower brightness. Therefore, such an object is over exposed. The difference of the reflectivity of the object may also occur depending on the color of the object. For example, when the color of an object is yellow, the reflectivity may be up to 70%. In such a case, if the standard reflectivity is assumed to be 18%, the exposure value is approximately 2 Ev lower than necessary. If the object color is blue, the reflectivity is approximately 9%. In this case, the object is over exposed by approximately 9%. In greater than necessary.

Therefore, in the conventional photometry device, the photographer is required to guess the reflectivity of the object. Then, based on the reflectivity determined by the photographer, the exposure is controlled such that, if the object is a whitish or yellowish one having a relatively high reflectivity, it is to be overexposed, and if the object is a blackish or bluish one having a relatively low reflectivity, it is to be underexposed. With this operation, the above-described defects may be solved. However, to accurately guess the reflectivity of the object and control the exposure can be done only by experienced and skilled photographers. It is impossible to require all the photographers to do such an operation. Further, it is not preferable that a manual operation of the photographer is required for exposure. Further, if such a manual operation is required, cameras become unsuitable for recent trend of the automatic photographing.

It may be possible to measure the color of the object, and perform exposure compensation based on the reflectivity corresponding to the measured color. If such a control is performed, an appropriate exposure value seems to be obtained automatically regardless of the color of the object. To perform such operation, a plurality of sensors for colorimetry may be provided inside the camera for selectively measuring different portions of the object, and a so-called TTL colorimetry may be performed. That is, light passed through a photographing lens of the camera is received by the plurality of sensors. When such a structure is adopted, however, the spectral reflection characteristics of the object and the spectral radiant characteristic of an external light source are overlapped when the colorimetry is performed. Therefore, due to the spectral radiant characteristics of the external light source illuminating the object, it becomes difficult to measure the object color accurately. Then, the compensation amount of the exposure value includes errors, and the appropriate exposure may not be achieved.

SUMMARY OF THE INVENTION

It is therefore an object of the invention to provide an improved photometry device with which appropriate exposure values can be obtained regardless of difference of reflectivity of the objects without being affected by the spectral radiant characteristics of a light source illuminating the object.

For the above object, according to an aspect of the invention, there is provided a photometry device for a camera, which is provided with a normal light sensor having spectral sensitivity characteristics close to visual sensitivity characteristics, a plurality of colorimetric sensors having spectral sensitivity characteristics that are different from those of the normal light sensor, an exposure amount determining system that determines an exposure amount of an object in accordance with an output of the normal light sensor, a colorimetry system that judges a color of the object in accordance with the outputs of the plurality of colorimetric sensors, an external light sensor that measures an external light illuminating the object at spectral sensitivity characteristics corresponding to each of the plurality of colorimetric sensors, the colorimetry system judging the color of the object by compensating the outputs of the plurality of colorimetric sensors based on the outputs of the external light sensor, a compensation amount determining system that determines an exposure compensation amount in accordance with the color judged by the colorimetry system, and a controller that compensates for the exposure amount determined by the exposure amount determining system in accordance with the exposure compensation amount.

With this configuration, since the exposure amount, which is determined similarly to a procedure in the conventional art is compensated in accordance with the color of the object. It should be noted that the color of the object is determined taking the characteristics of the light illuminating the object. Therefore, regardless of the color of the object, an appropriate exposure value can be obtained without being affected by the color of the light illuminating the object.

Optionally, the normal light sensor and the plurality of colorimetric sensors may receive light which is reflected by the object and passed through a photographing optical system, which includes a photographing lens, of the camera, and the external light sensor may receive light which is not passed through the photographing optical system of the camera.

Preferably, the normal light sensor may include a normal light photometry sensor, the spectral sensitivity characteristic of which has a peak sensitivity at a wavelength within a range from 500 nm through 600 nm, the plurality of colorimetric sensors may include a blue light photometry sensor for metering blue light component, a green light photometry sensor for metering green light component, and a red light photometry sensor for metering red light component, and the external light sensor may include a photometry sensor having photometry areas for metering blue, green and red light components, respectively.

Further preferably, the plurality of colorimetric sensors and the normal light sensor may include photometric elements having the same photometric characteristics. The external light sensor may also have the same photometric characteristics.

In this case, the blue light photometry sensor may be provided with a blue filter, the green light photometry sensor may be provided with a green filter, the red light photometry sensor may be provided with a red filter. Further, the external light sensor may be provide with filters, whose spectral transmissivity characteristics are substantially the same as those of the blue, green and red filters provided to the colorimetric sensors, at the plurality of photometry areas, respectively. In other words, the blue light photometry sensor, the green light photometry sensor, the red light photometry sensor and the photometry areas of the external light sensor have substantially the same spectral sensitivity characteristics, respectively.

Preferably, the normal light sensor, the plurality of colorimetric sensors and the external light sensor have substantially the same structure except the filters.

In particular, at the upper central portion of a pentagonal prism of the camera, the normal light sensor and the green light sensor are arranged side by side, the blue light sensor and the red light sensor are arranged on the eyepiece optical system side of the pentagonal prism, at right-and-left portions with respect to the eyepiece optical system, and the external light sensor may be arranged on an upper front position of the pentagonal prism, the external light sensor facing a window formed on a body of the camera so that the external light is incident on the external light sensor through said window.

In a particular case, the green light sensor may double as the normal light sensor.

Still optionally, the colorimetry system compensates for outputs of two of the colorimetry sensors in accordance with the outputs of the photometry areas of the external light sensor.

Further optionally, the colorimetry system may Judge at least yellow, blue and red from among yellow, magenta, cyan, blue, green and red, in accordance with the outputs of the plurality of colorimetry sensors. Then, the compensation amount determining system determines the exposure compensation amount in an over exposure side if the colorimetry system judges the color is yellow, and the compensation amount determining system determines the exposure compensation amount in an under exposure side if the colorimetry system judges the color is blue or red.

In this case, the compensation amount determining system may determine that the compensation amount is zero if the colorimetry system judges the color is magenta, cyan or green.

Still optionally, each of the normal light sensor, and the plurality of colorimetry sensors has divided photometry areas, and the exposure amount determining system and compensation amount determining system may determine the exposure amount and the exposure compensation amount in accordance with the outputs of each of the divided photometry areas.

In this case, the colorimetry system may judge the color of the object at each of the divided photometry areas, and the compensation amount determining system determines the exposure compensation amount for each of the divided photometry areas.

Then, the exposure amount determining system may determine an exposure compensation amount for the entire object by applying a predetermined calculation to the exposure compensation amounts obtained for the plurality of divided photometry areas.

BRIEF DESCRIPTION OF THE ACCOMPANYING DRAWINGS

FIG. 1 shows a perspective view of a camera employing a photometry device according to the invention;

FIG. 2 schematically shows main components of the camera shown in FIG. 1;

Figure 4A:
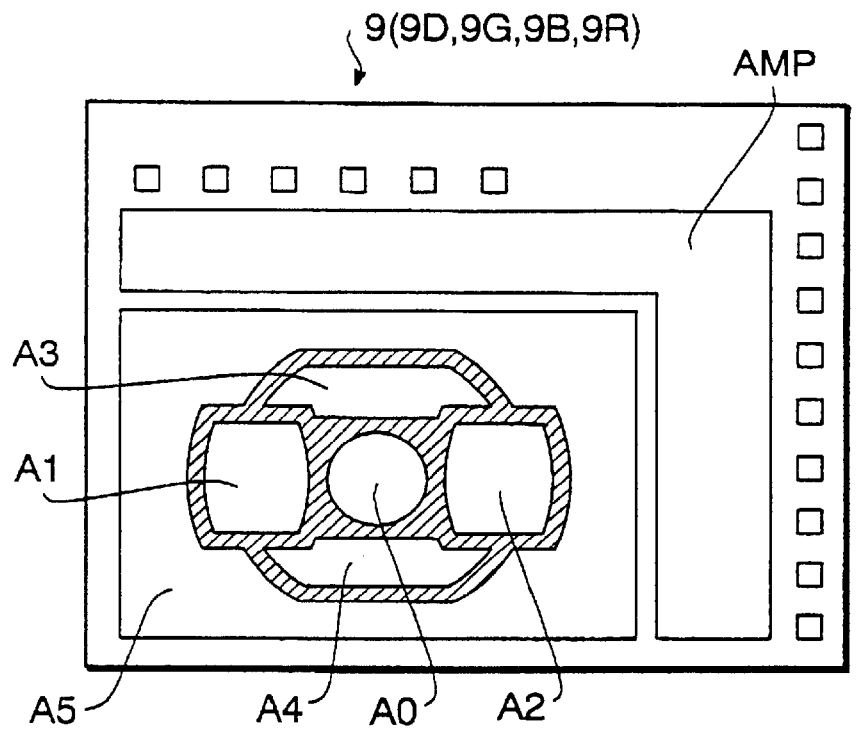
Figure 4B:
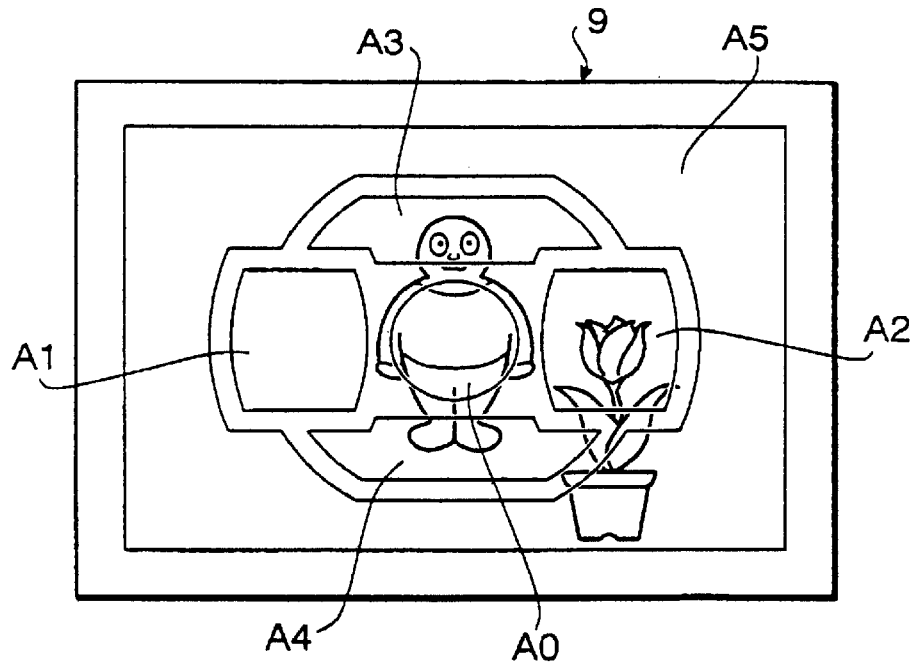
Figure 8:
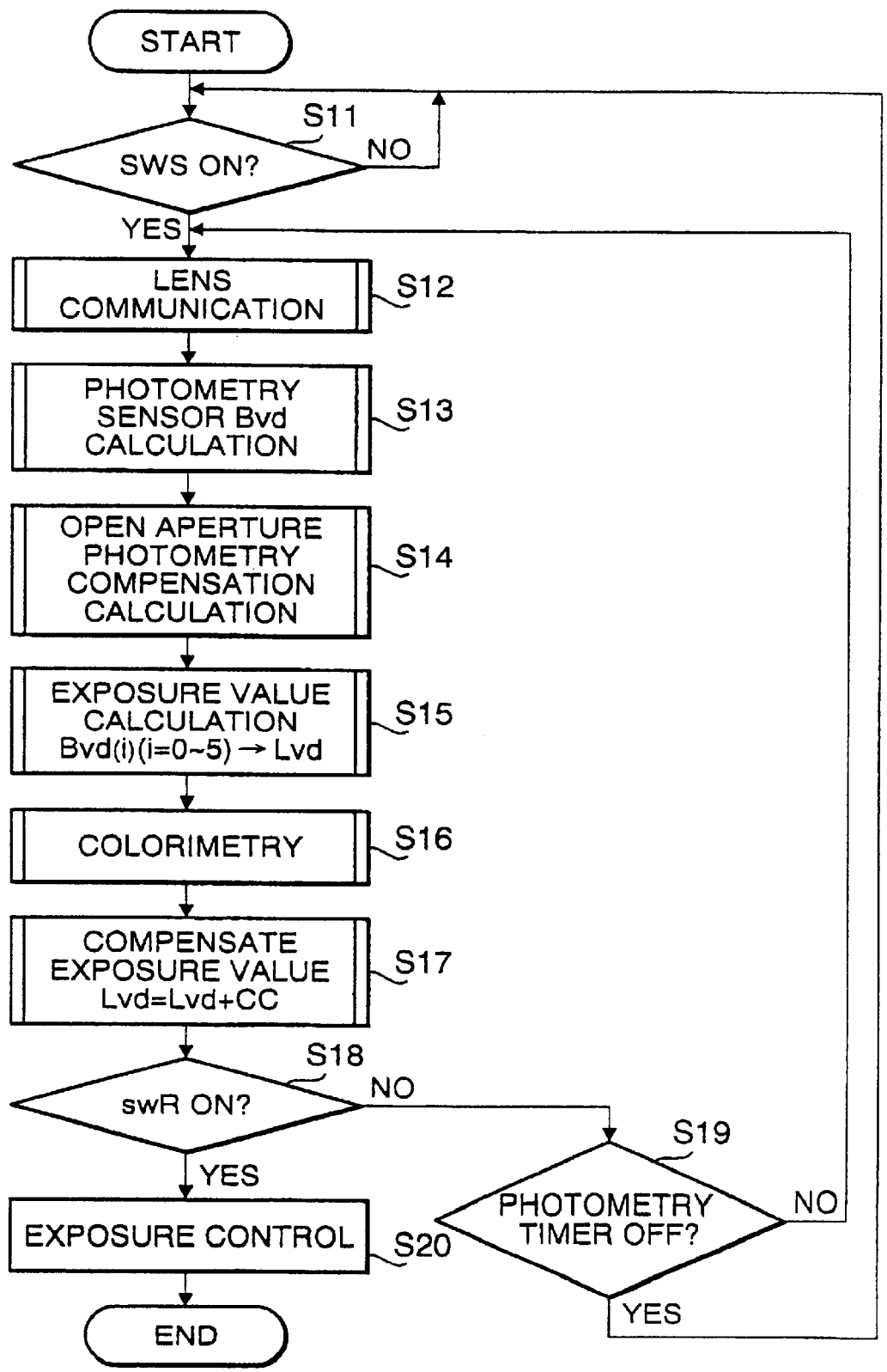
Figure 9:
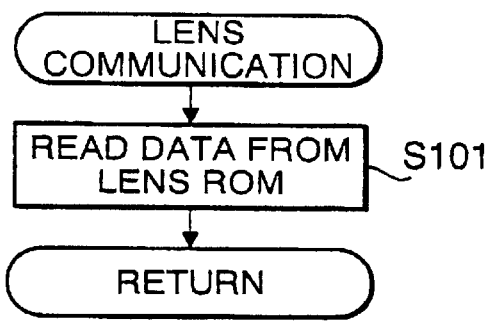
Figure 10:
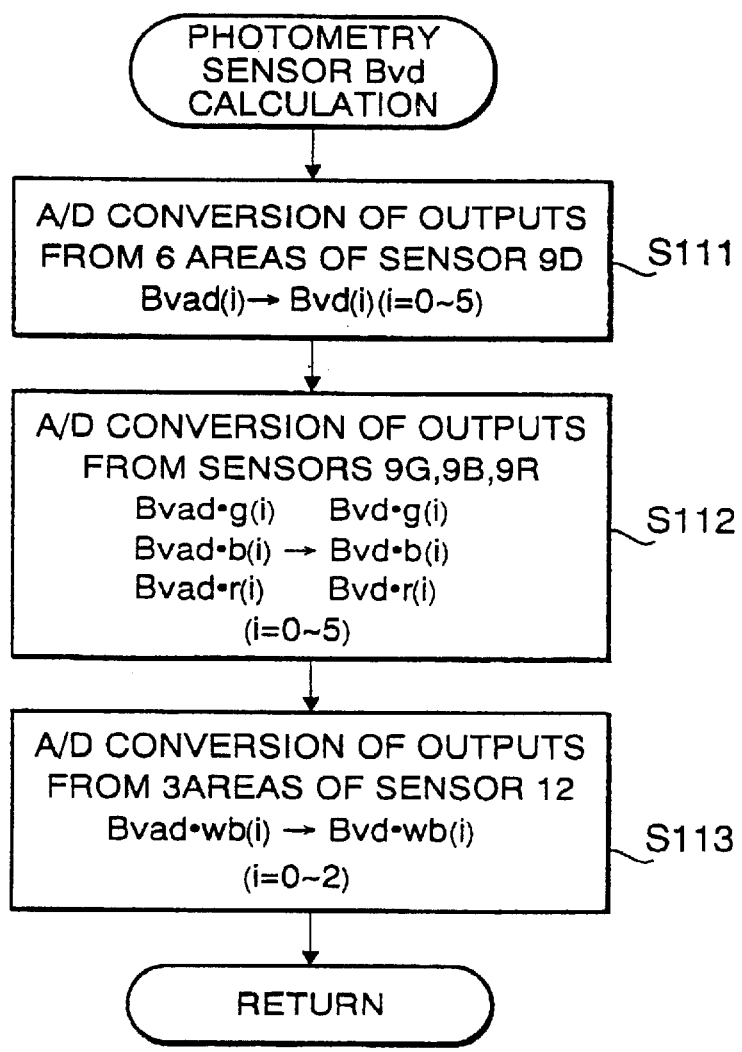
Figure 11:
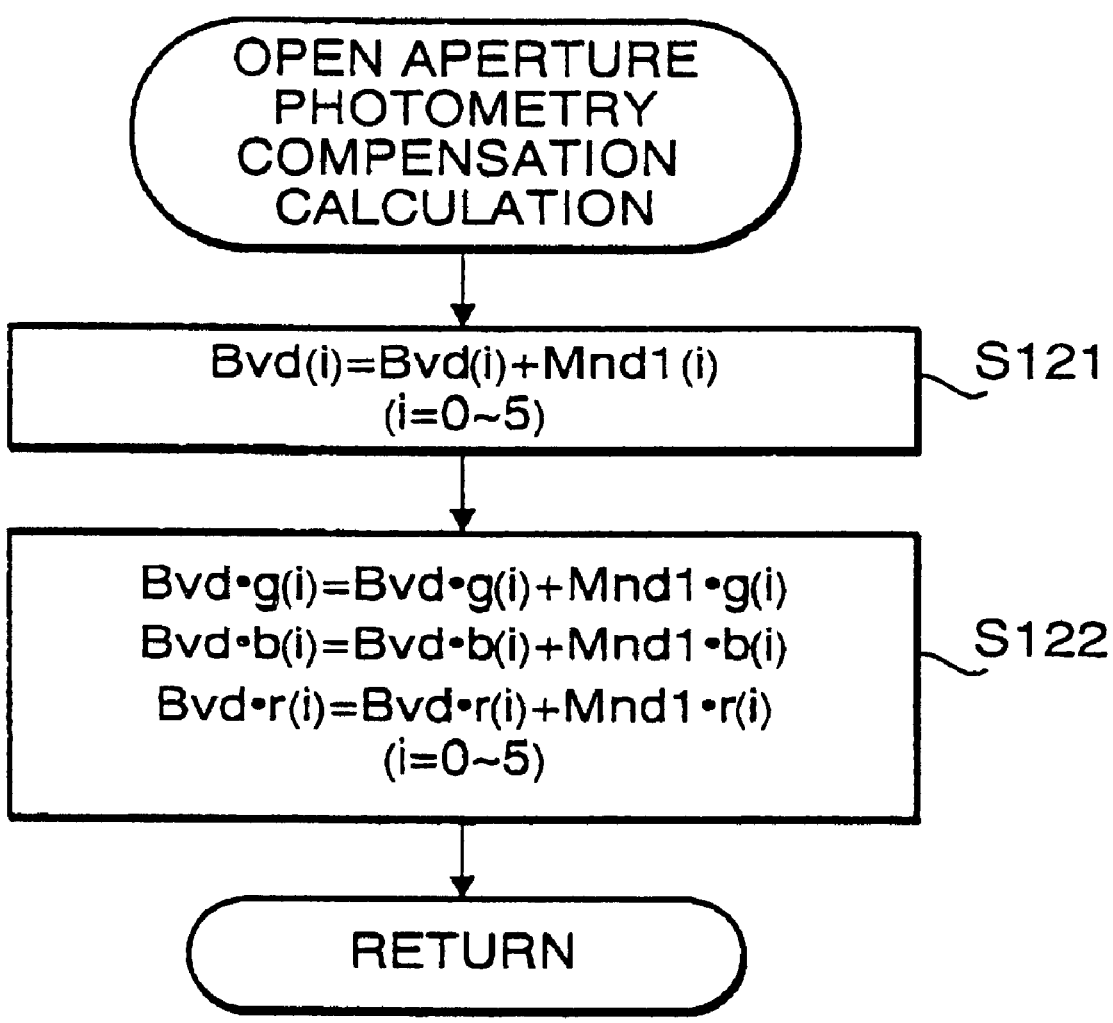
Figure 12:
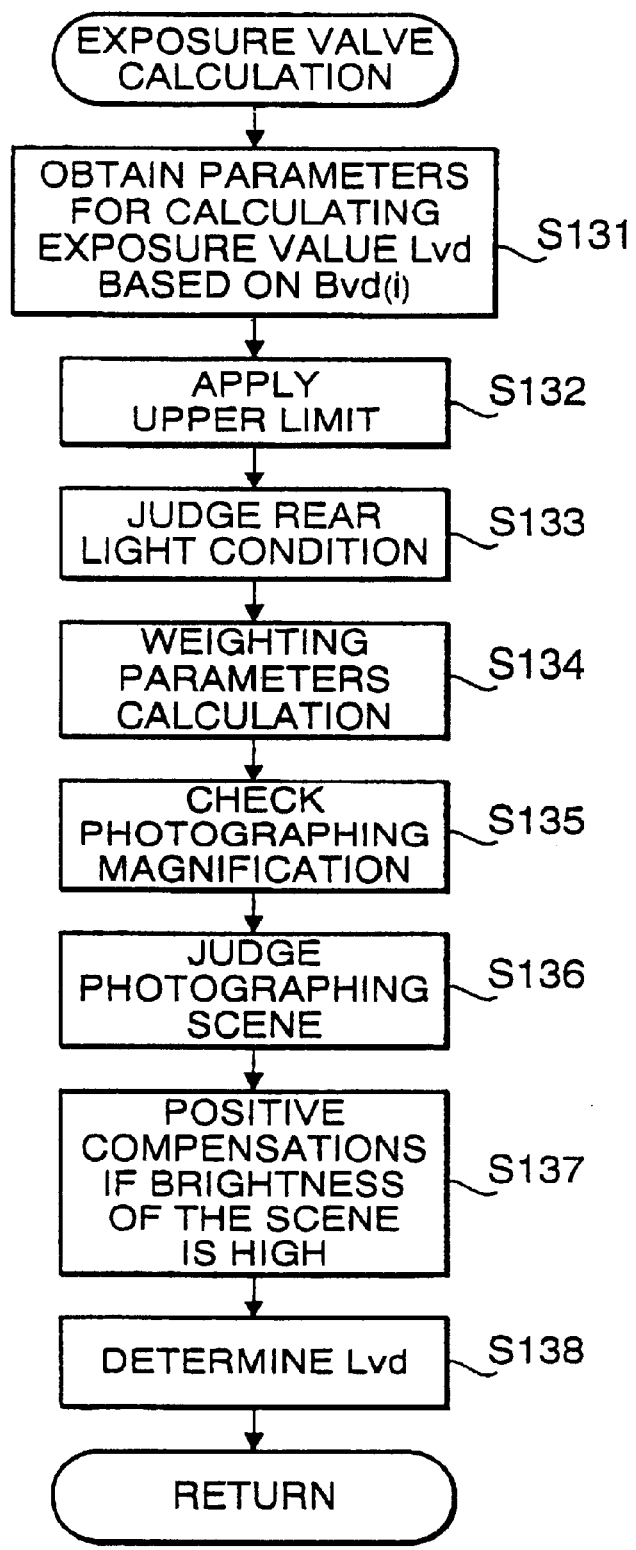
Figure 13:
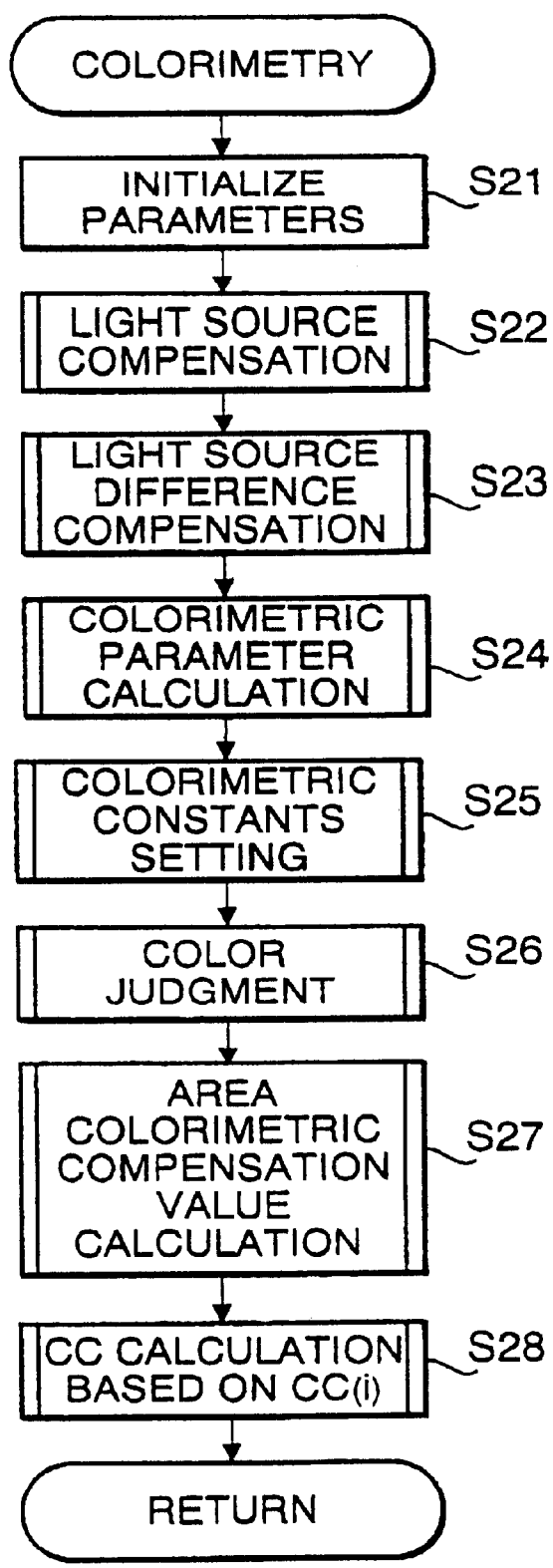
Figure 14:
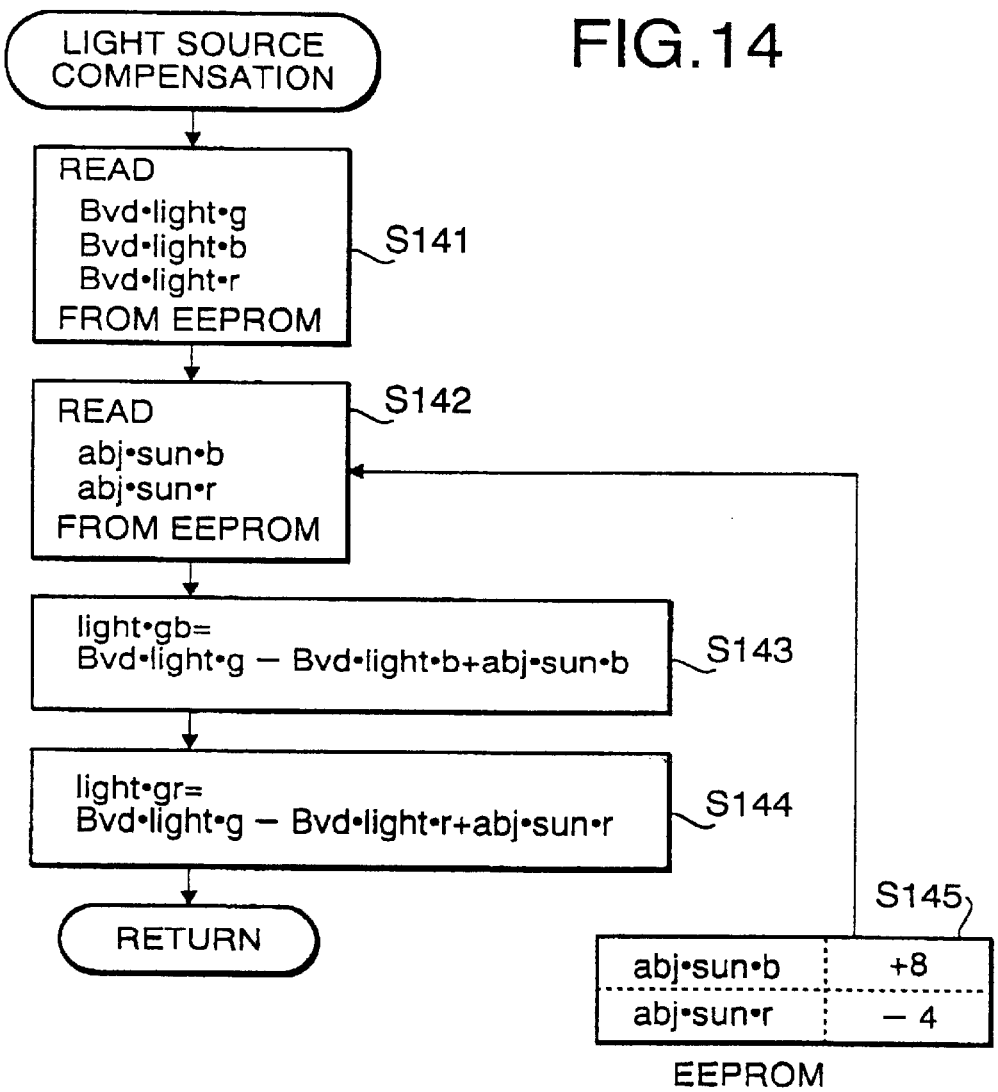
Figure 15:
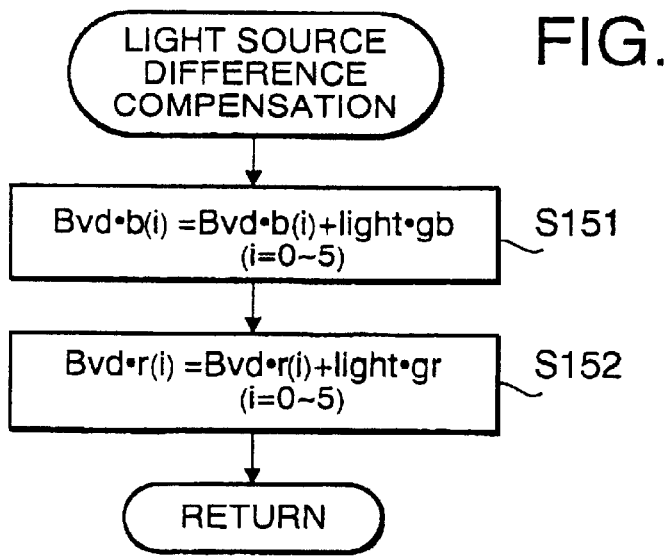
Figure 18:
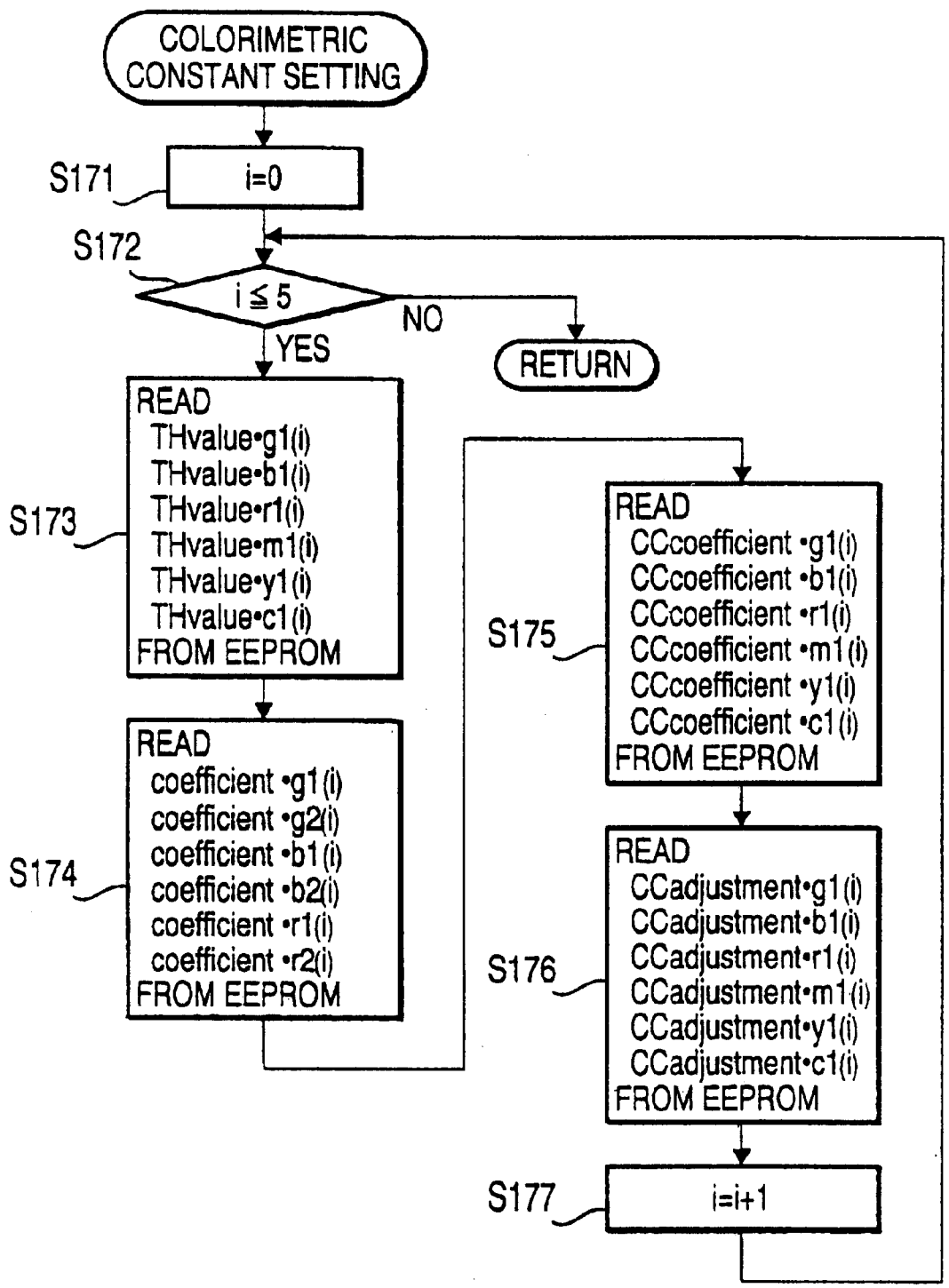
Figure 20:
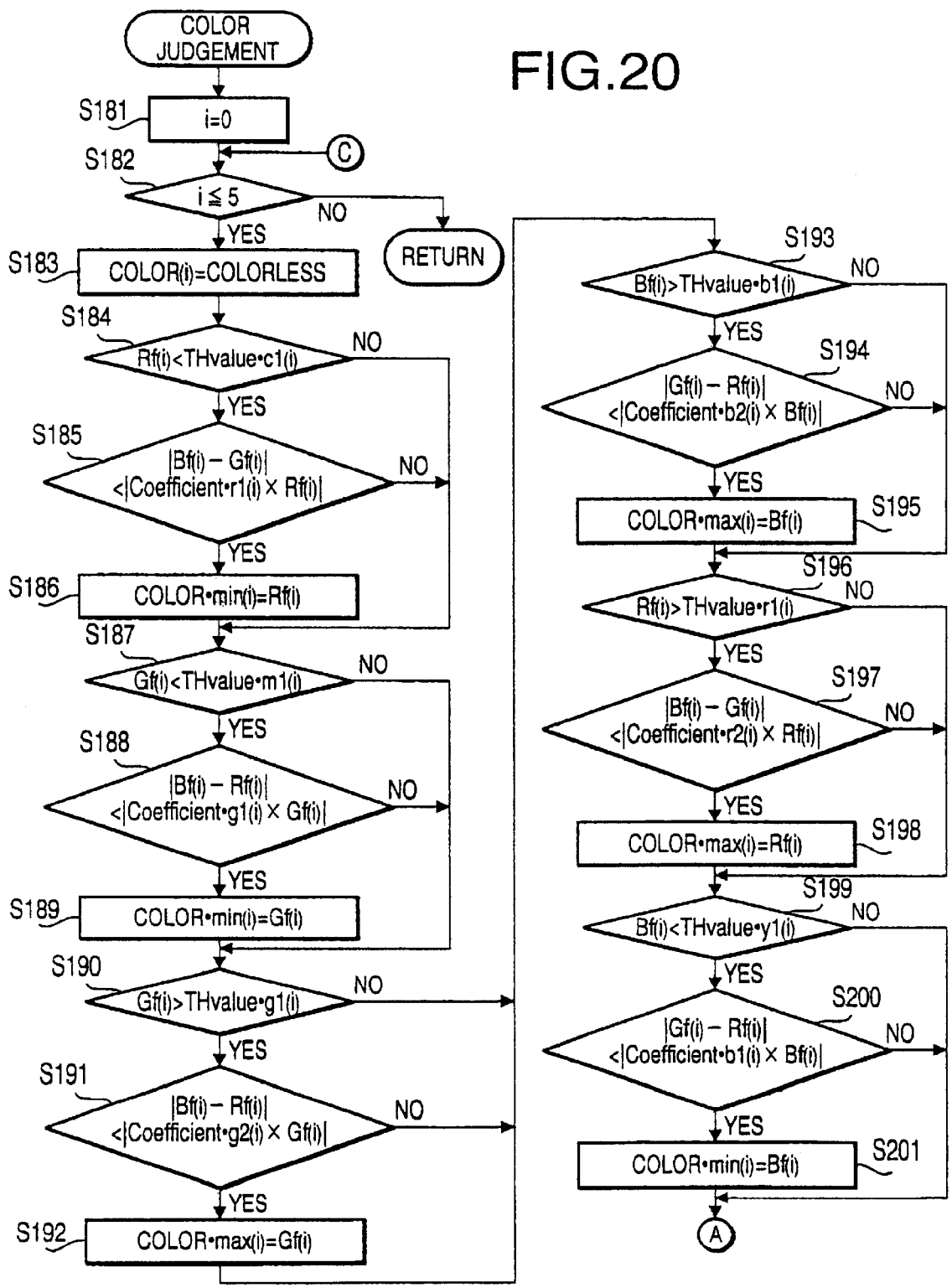
Figure 21:
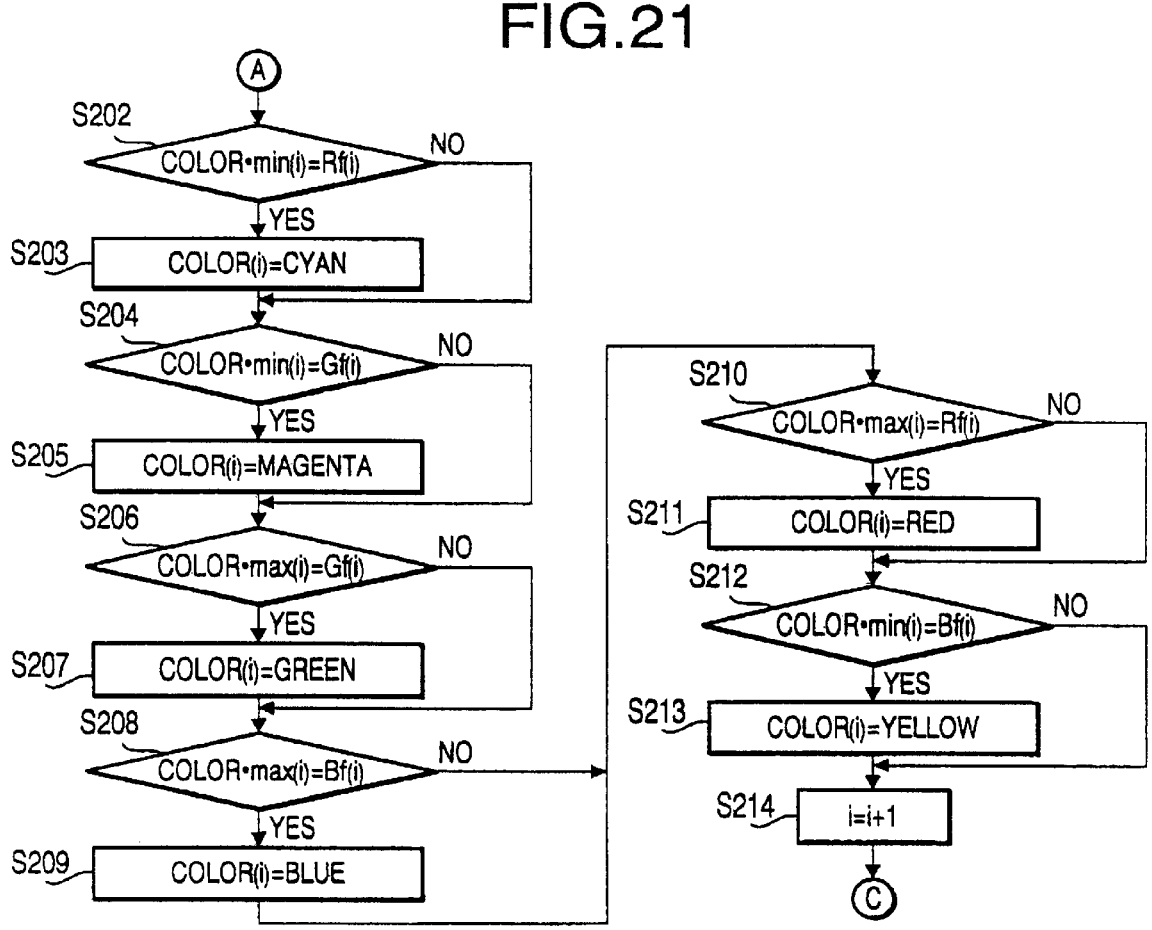
Figure 22:
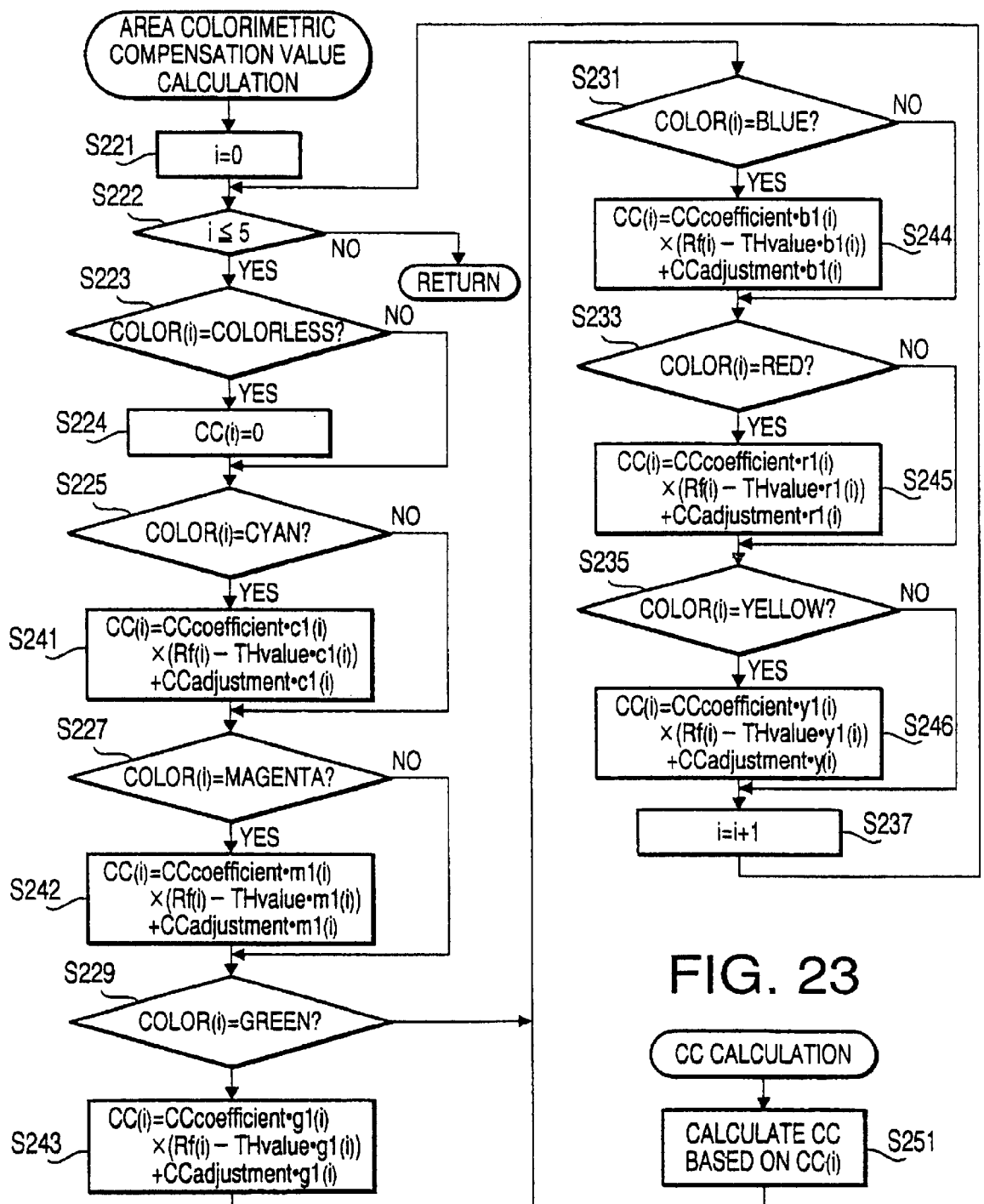
Figure 23:
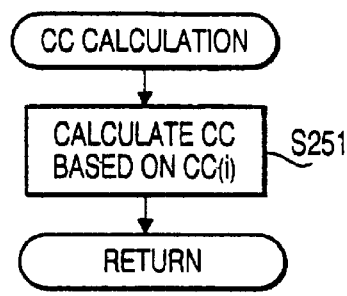

FIG. 4A schematically shows a structure of each of the photometry sensors;

FIG. 4B shows a relationship between the photometry areas of each photometry sensor;

FIGS. 5A–5D show a structure of a photometry sensor for a light source, and photometry and colorimetry sensors;

FIG. 6 shows spectral sensitivity characteristics of the green, blue and red light sensors;

FIG. 7 shows a block diagram of main portions of the camera;

FIG. 8 is a flowchart illustrating a main procedure of a photometry operation according to an embodiment;

FIG. 9 is a flowchart illustrating the "lens communication procedure";

FIG. 10 shows a flowchart illustrating the "photometry sensor Bvd calculation procedure";

FIG. 11 is a flowchart illustrating the "open aperture photometry compensation calculation procedure";

FIG. 12 is a flowchart illustrating an "exposure value calculation procedure";

FIG. 13 is a flowchart illustrating a "colorimetry procedure";

FIG. 14 is a flowchart illustrating the "light source compensation procedure";

FIG. 15 is a flowchart illustrating the "light source difference compensation procedure";

FIGS. 16A–16F show exemplary spectral sensitivity characteristics of photometry sensors 9B, 9G and 9R;

FIG. 17 is a flowchart illustrating the "colorimetric parameter calculation procedure";

FIG. 18 is a flowchart illustrating the "colorimetric constant setting procedures";

FIG. 19 shows an example of constants read from the EEPROM;

FIGS. 20 and 21 show a flowchart illustrating the "color judgment procedure";

FIG. 22 shows an example of the "area colorimetric compensation value calculation procedure"; and FIG. 23 is a flowchart illustrating a "CC calculating procedure", which is called at S28 of the main procedure.

DESCRIPTION OF THE EMBODIMENTS

Hereinafter, referring to the accompanying drawings, an embodiment according to the present invention will be described.

Figure 1:
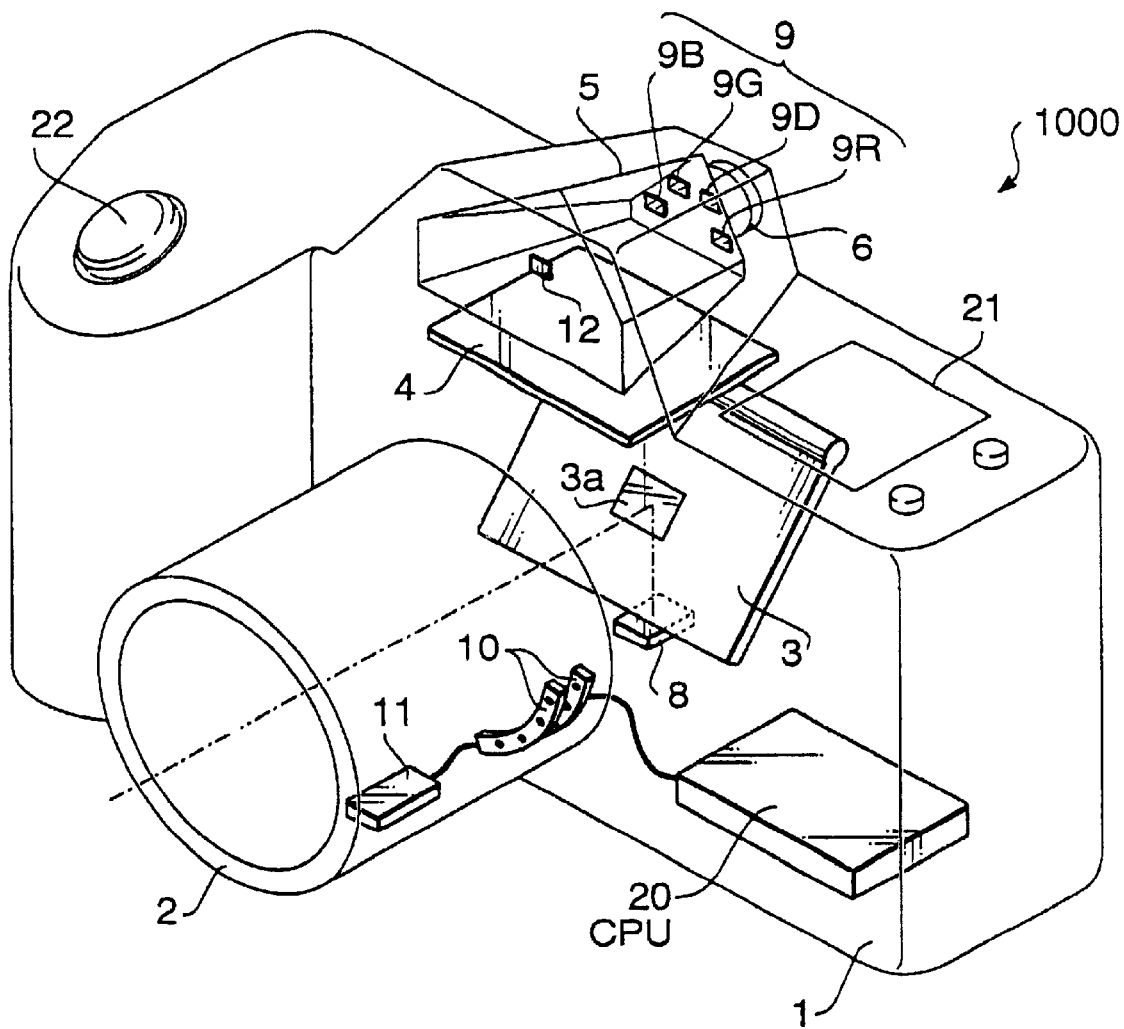
Figure 2:
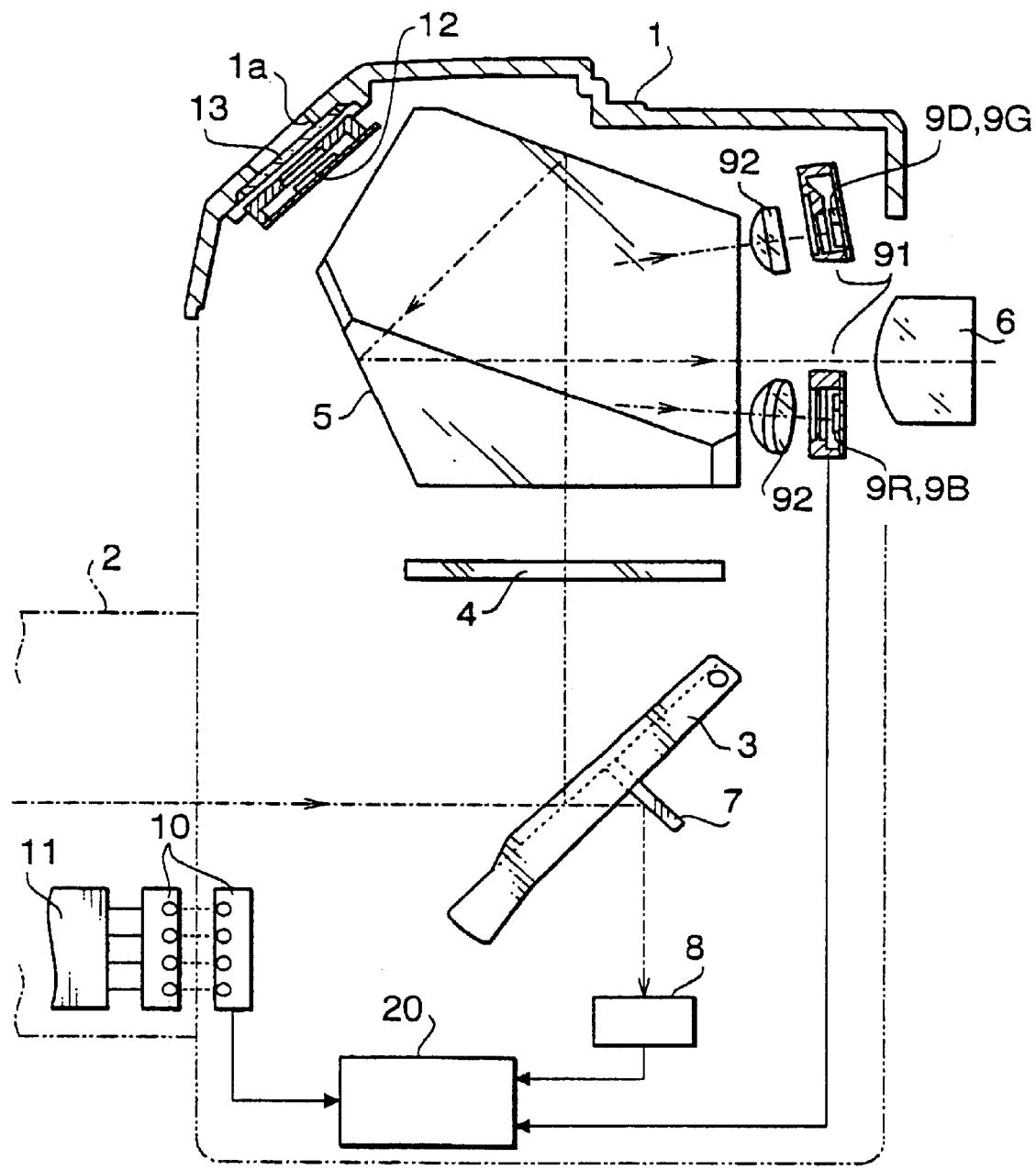

FIG. 1 shows a perspective view of a camera 1000 employing a photometry device according to the invention, and FIG. 2 schematically shows main components of the camera 1000.

The camera 1000 has a camera body 1, to which a photographing lens 2 is detachably coupled. The camera body 1 accommodates a quick return mirror 3, a focusing glass 4, a pentagonal prism 5 (or a pentagonal mirror), and an eyepiece optical system 6. A part of the quick return mirror 3 is formed to be a half mirror 3a (see FIG. 1), and behind the half mirror 3a, an auxiliary mirror 7 is provided. Light passed through the half mirror 3a is reflected by the auxiliary mirror 7, and is directed toward a distance measuring device 8. The distance measuring device 8 is used for an AF (Automatic focusing) control. On the rear side of the pentagonal prism 5, four photometry sensors 9 (9D, 9R, 9G and 9B) are provided (see FIGS. 1 and 2), each of which functions as a photometry element and receives part of light passed through the photographing lens 2. Based on the outputs of the photometry sensors 9, a photometry operation for determining exposure parameters is executed. On an upper front portion of the camera body 1, a window 1a is formed, and a photometry sensor 12 for receiving light passed through the window 1a is provided, with a milky-white diffusing plate 13 being located therebetween. The external light entered through the window 1a is diffused by the diffusing plate 13 and measured by the photometry sensor 12. The photographing lens 2 and the camera body 1 are electrically connected through electrical contacts 10. Thus, a lens ROM 11 built in the photographing lens 2 is electrically connected to a control circuit 20 accommodated in the camera body 1. On an outer surface of the camera body 1, an LCD (liquid crystal display) 21, and various buttons such as a release button 22 are provided. Furthermore, inside the camera body 1, various mechanisms such as a film winding mechanism are provided. However, such mechanisms are conventionally known, and description thereof will be omitted for the sake of the simplicity.

Figure 3A:
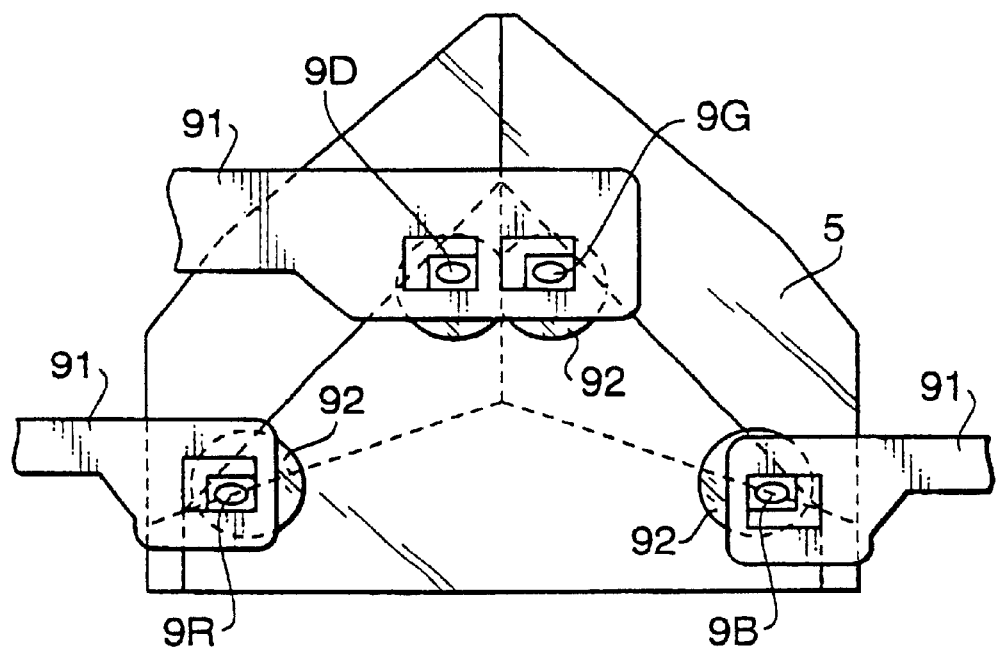
FIG. 3A shows an arrangement of photometry sensors.

FIG. 3A shows a rear view of the pentagonal prism 5. As shown in FIG. 3A, the four photometry sensors 9 includes sensors 9D and 9G provided at an upper central portion On the eyepiece side of the pentagonal prism 5, and sensors 9B and 9R provided at lower side portions on the eyepiece side of the pentagonal prism 5. The photometry sensors 9D, 9G, 9B and 9R are mounted on an FPC (flexible printed circuit board) 91 and fixedly positioned at the above-described respective positions by the FPC 91. In front of (i.e., on the pentagonal prism side of) each of the photometry sensors 9D, 9G, 9B and 9R, a collective lens 92 is provided to form an object image on each of the sensors 9D, 9G, 9B and 9R.

FIG. 4A schematically shows a structure of each of the sensors 9D, 9G, 9B and 9R. As shown in FIG. 3A, each sensor 9 (9D, 9G, 9B or 9R) is constructed as a planar structure photometry IC chip that is configured such that a light receiving section and an amplifier AMP are integrally formed. The light receiving section includes six photometry areas, i.e., a central area A0, a left area A1, a right area A2, an upper area A3, a lower area A4, and a peripheral area A5. FIG. 4B shows a relationship between the photometry areas A0–A5 and portions of an object. The photometry areas A0–A5 of each sensor receives the light from respective portions of an object as indicated in FIG. 4B. The photometry sensor 9G is provided with a green filter GF on its light receiving surface (see FIG. 5B), and receives a green component of light, the photometry sensor 9B is provided with a blue filter BF on its light receiving surface (see FIG. 5C), and receives a blue component of light, and the photometry sensor 9R is provided with a red filter RF on its light receiving surface (see FIG. 5D), and receives a red component of light. In this embodiment, the three sensors 9G, 9B and 9R are used as colorimetry elements. Spectral sensitivity characteristics of the sensors 9G, 9B and 9R respectively provided with the green, blue and red filters GF, BF and RF are indicated in FIG. 6. The sensors 9G, 9B and 9R have peaks in sensitivity at approximately 530 nm, 420 nm, and 630 nm, respectively. The remaining sensor 9D is not provided with a color filter. It should be noted, however, that the spectral sensitivity characteristic of the sensor 9D has its peak within a wavelength range of 500–600 nm, which is close to the visual sensitivity characteristic. The sensor 9D is used as a normal light detecting sensor.

Figure 5C:
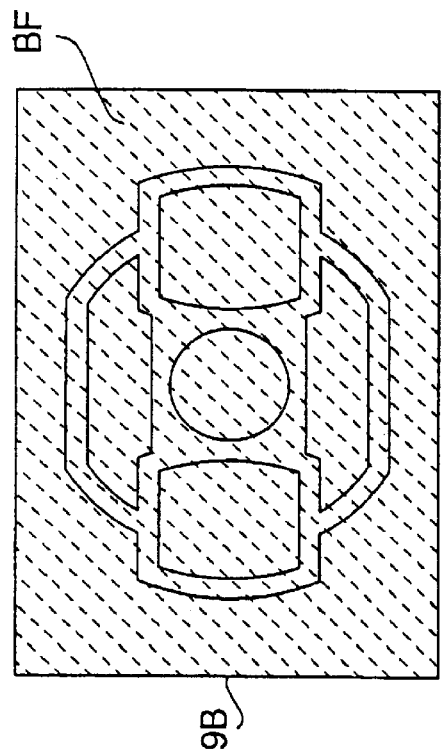
Figure 5D:
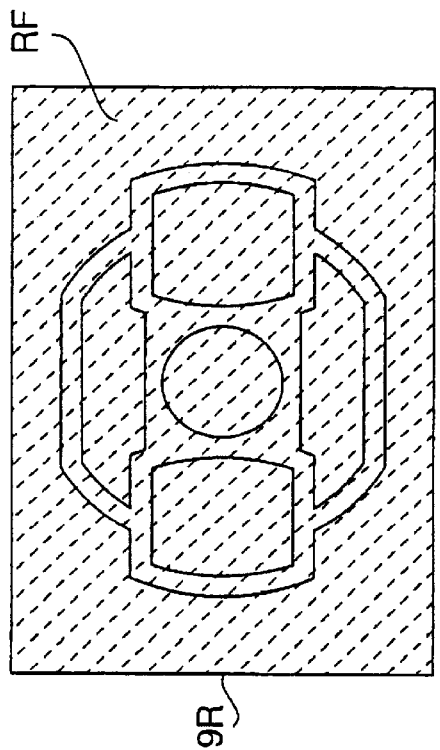
Figure 5A:
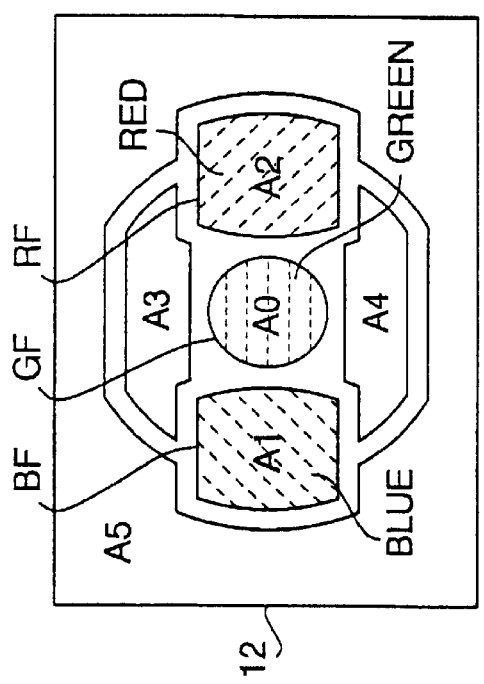
Figure 5B:
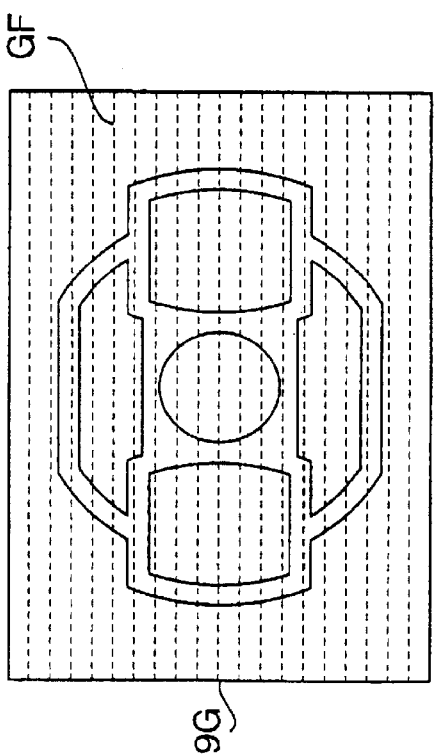

As shown in FIG. 5A, the photometry sensor 12 is formed of the same IC chip as the sensors 9. Among the photometry areas A0–A5 of the photometry sensor 12, however, only the areas A0, A1 and A2 are used. Further, a green filter GF is provided in front of the area A0, a blue filter BF is provided in front of the area A1, and a red filter RF is provided in front of the area A2. The filters GF, BF and RF provided to the photometry sensor 12 have the same spectral transmissivity characteristics as the filters provided to the photometry sensors 9G, 9B and 9R, respectively. With this configuration, the areas A0, A1 and A2 of the photometry sensor 12 receive green, blue and red components of the external light illuminating the object, respectively. Since all the photometry sensors are formed of the same IC chip, the spectral sensitivity, output characteristics and the like are substantially the same. Further, since the same IC chip is used, manufacturing cost can be reduced. Further, since the same filters are used for the areas A0–A2 of the photometry sensor 12 and the photometry sensors 9G, 9B and 9R, respectively, the spectral sensitivity characteristics of these sensors are substantially identical, respectively.

FIG. 7 shows a block diagram of main portions of the camera 1000. The four sensors 9D, 9G, 9B and 9R output values indicative of quantity of received light (components) to the controller 20, respectively. From the photometry sensor 12, photometry values for green, blue and red components of the external light are output. Further, the output (i.e., a distance value) of the distance measuring device 8 is input to the controller 20, which controls the AF device 25 to perform the automatic focusing operation.

Furthermore, the controller 20 is connected with a photometry switch SWS and a shutter-release switch SWR. The photometry switch SWS is ON when the release button 22 is half depressed. The shutter-release switch SWR is ON when the shutter button is fully depressed. When the shutter button is depressed halfway and the photometry switch SWS is turned ON, the controller 20 performs a photometry calculation in accordance with a predetermined algorithm, and calculates an exposure value. Then, the controller 20 controls the exposure control device 23 in accordance with the calculated exposure value to perform a photographing operation. Further, the controller 20 drives a display driver 24 to display the calculated exposure value on the LCD panel 21. It should be noted that the controller 20 includes an EEPROM 26 storing various values necessary for the photometry calculation (which will be described in detail later), and a RAM 27 for temporarily storing various pieces of data.

An operation of the photometry device will be described hereinafter.

FIG. 8 is a flowchart illustrating a main procedure of a photometry operation. When the release button 22 is half depressed and the photometry switch SWS is ON (S11:YES), a "lens communication procedure" is performed (S12) so that the controller 20 receives data intrinsic to the photographing lens 2 currently mounted onto the camera body 1. Specifically, the data intrinsic to the photographing lens 2 includes an open f-number, a focal length of the photographing lens 2 and the like, which may affect the photometry calculation. The data is transmitted from a lens ROM 11 of the photographing lens 2 to the controller 20 through the electrical contacts 10. Then, a "photometry sensor output Bvd calculation procedure" is executed (S13). In this procedure, the photometry sensors 9 (9D, 9G, 9B and 9R) output analog photometry values which are obtained by receiving light through the photographing lens 2, the quick return mirror 3, and the pentagonal prism 5. Then, the analog values are converted into digital brightness values Bvd which can be used in the operation executed by the controller 20. Then, based on the brightness value Bvd obtained at S13 and the lens data intrinsic to the photographing lens 2 retrieved at S12, an "open aperture photometry compensation calculation procedure" is executed (S14) to compensate for errors depending on individual photographing lenses.

At S15, an "exposure value calculation procedure" is executed. In this procedure, based on the brightness value Bvd, which is obtained in accordance with the output of the photometry sensor 9D for normal light, an exposure value Lvd is calculated. In this procedure, parameters for calculating the exposure value Lvd in accordance with photographing conditions, e.g., a rear light condition, a magnification and/or scene of photographing, are obtained. Then, based on the parameters, the exposure value Lvd is calculated.

At S16, based on the brightness value Bvd obtained by each of the sensors 9R, 9B and 9G for the RGB (Red, Green and Blue) color components and the brightness values obtained by the photometry sensor 12, a "colorimetry procedure" is executed. Specifically, based on the brightness values output by the photometry sensor 12, compensation values for compensating errors of the output values of the sensors 9R, 9B and 9G due to the color of the external light are determined. Then, based on the compensation values, the brightness values Bvd obtained by the photometry sensors 9R, 9G and 9B are compensated. Then, based on the compensated brightness values Bvd, the color of the object is determined, and a colorimetric compensation value CC is calculated based on the determined color of the object. In S17, an "exposure value colorimetric compensation procedure" is executed, where the exposure value Lvd obtained at S15 is compensated based on the colorimetric compensation value CC.

At S18, if the shutter-release switch SWR is ON (S18:YES), the exposure control device 23 controls the exposure operation at S20 in accordance with the exposure value Lvd obtained at S17 to execute a photographing operation. If the shutter-release switch SWR is OFF, controls goes to S19, where it is detected whether a photometry timer is OFF.

If the photometry timer is ON (i.e., if a predetermined period has not elapsed)(S19:NO), control proceeds to S12, and the foregoing procedures are repeated. If the photometry timer is OFF (i.e., if the predetermined period has elapsed) (S19:YES), control proceeds to S11.

FIG. 9 is a flowchart illustrating the "lens communication procedure", which is called at S12 of the main procedure shown in FIG. 8.

In the lens communication procedure, the controller 20 accesses the lens ROM 11 through the electrical contacts 10, and reads the data intrinsic to the photographing lens 2 stored in the lens ROM 11 (S101). The data is stored in the RAM 27 of the controller 20, and control returns. Items included in the data intrinsic to the photographing lens 2 include, for example, a lens type, lens data, the shortest focusable distance, a focusable range, a focal length of the photographing lens, an exit pupil position, an open f-number, an aperture efficiency and the like. In this embodiment, the controller 20 reads at least the focal length, the exit pupil position, the open f-number and the aperture efficiency, and stores the data in the RAM 27.

FIG. 10 shows a flowchart illustrating the "photometry sensor Bvd calculation procedure", which is called at S13 in the main procedure shown in FIG. 8.

In this procedure, data Bvad(i) (where, i=0, 1, . . . , 5) which represents A/D converted output voltages (analog data) of the photometry areas Ai (i=0, 1, . . . , 5) shown in FIG. 4A of the photometry sensor 9D for normal light are obtained. Further, data Bvad·g(i), Bvad·b(i) and Bvad·r(i) which represent A/D converted values of the output voltages of the photometry areas Ai (i=0, 1, 2, . . . , 5) of each of the sensors 9G, 9B and 9R for color components are obtained. Then, the A/D converted values Bvad(i) of the sensor 9D output are adjusted to brightness values Bvd(i) (S111). The A/D converted values Bvad·g(i), Bvad·b(i) and Bvad·r(i) (i=0, 1, 2, . . . , 5) are also adjusted to the brightness values Bvd·g(i), Bvd·b(i) and Bvd·r(i), respectively (S112). Further, the A/D converted values Bvad·wb(i) (where i=0, 1 and 2), which represent the outputs from the areas A0–A2 of the photometry sensor 12, respectively, are adjusted to the brightness values Bvd·wb(i), respectively (S113).

FIG. 11 is a flowchart illustrating the "open aperture photometry compensation calculation procedure" which is called at S14 of the main procedure shown in FIG. 8.

At S121, an open aperture photometry compensation value Mnd1(i) is calculated based on the focal length, the exit pupil position, the open f-number and the aperture efficiency stored in the RAM 27. Compensation values mv1, mv2, mv3 and mv4 for compensating for shift amounts with respect to the reference photometry values due to the individual differences of the optical characteristics of the cameras, and the focal length, the exit pupil position, the open aperture and the aperture efficiency, are determined. Then, the sum of the compensation values mv1+mv2+mv3+mv4 is obtained, which is referred to as the open aperture compensation value Mnd1(i). Following the similar procedure, the open aperture compensation values Mnd1·g(i), Mnd1·b(i), and Mnd1·r(i) are calculated. Then the open aperture compensation value Mnd1(i) is added to the brightness value Bvd(i), and then the sum is determined as a new brightness value Bvd(i). Thus, the following calculation is executed at S121:

$$Bvd(i)=Bvd(i)+Mnd1(i).$$

Similar to the above, with respect to the brightness values Bvd·g(i), Bvd·b(i) and Bvd·r(i) obtained by the photometry sensors 9G, 9B and 9R, open aperture photometry compensation values Mnd1·g(i), Mnd1·b(i) and Mnd1·r(i) are added to obtain newly defined brightness values (S122). That is:

$$Bvd·g(i)=Bvd·g(i)+Mnd1·g(i).$$

$$Bvd·b(i)=Bvd·b(i)+Mnd1·b(i).$$

$$Bvd·r(i)=Bvd·r(i)+Mnd1·r(i).$$

As a result, each brightness value is free from the affect of the individual differences of photographing lenses 2 when coupled to the camera body 1.

FIG. 12 is a flowchart illustrating an "exposure value calculating procedure", which is called at S15 of the main procedure.

In the "exposure value calculating procedure", the brightness values Bvd(i) are compensated in accordance with a photographing condition to obtain an appropriate exposure value Lvd. Specifically, in the "exposure value calculating procedure", the brightness values Bvd(i) (where i=0–5) corresponding to the photometry areas A0–A5 are compared with each other, or the brightness of the object as a whole is detected, and a condition of the object to be photographed (e.g., photographing with rear light, photographing at dusk, or photographing at night) is determined. Then, based on the determined condition, the brightness values Bvd(i) are weighted, or one of the brightness values Bvd(i) is selected and then the exposure value Lvd suitable to the photographing condition is determined. Then, based on the brightness values Bvd(i), parameters for calculating the exposure value Lvd are calculated at S131. Then, the upper brightness limit of a parameter is calculated (S132), compensation value for the rear light is calculated (S133), weighting parameters M is calculated (S134), a photographing magnification M is checked (S135), a photographing scene is judged (S136), a positive compensation value for a high brightness photographing scene is calculated (S137), and the exposure value Lvd is calculated based on the calculated parameters and the brightness values Bvd(i) (S138).

FIG. 13 is a flowchart illustrating a "colorimetry procedure" called at S16 of the main procedure.

In the "colorimetry procedure", the color of the object is detected, and a colorimetric compensation value CC is calculated in accordance with the detected color of the object.

At S21 colorimetric parameters are initialized (i.e., set to initial values). Depending on the color temperature of a light source illuminating the object, the colorimetric value varies. At S22, a "light source compensation procedure" is executed to obtain compensation values for the effects of the color temperature of the light source. At S23, a "light source difference compensation procedure" is executed using the compensation values obtained at S22. At S24, a "colorimetric parameter calculation procedure" for obtaining colorimetric parameters, which will be used for execution of a "colorimetric calculation procedure", is executed. At S25, a "colorimetric constant setting procedure" is executed to set constants used for color measurement. At S26, a "color judgment procedure" for judging a color based on the parameters and constants obtained in the preceding steps is executed. At S27, an "area colorimetric compensation value calculating procedure" is executed for calculating colorimetric compensation values CC(i) for the photometry areas A0–A5 in accordance with the judged color. At S28, a CC calculating procedure for calculating a colorimetric compensation value CC for an entire object in accordance with the colorimetric compensation values CC(i) for the respective photometry areas is executed.

At S17 (see FIG. 8), the exposure value Lvd obtained at S15 is compensated based on the colorimetric compensation value CC as a whole to obtain a final exposure value Lvd. That is, the final exposure value Lvd is calculated by the formula below:

$$Lvd = Lvd + CC.$$

Next, steps S22–S28 shown in FIG. 13 will be described in further detail.

FIG. 14 is a flowchart illustrating the "light source compensation procedure" called at S22 of FIG. 13. In the embodiment, when the initial Bvd value, which has been set at S21, of the photometry sensors 9 is determined, a predetermined light source (light source A) for adjustment is used.

When a photographing is to be executed, the Bvd should be compensated in accordance with the actually used light source, for example, the sun light. In the procedure shown in FIG. 14, relative compensation values of B (blue) and R (red) components with respect to the value for the green component are obtained.

Specifically, for the color components G, B and R, the brightness data Bvd·wb(0), Bvd·wb(1), and Bvd·wb(2), which are obtained by the photometry sensor 12 (FIG. 10, S113), are retrieved (S141). Then, a light source adjustment value adj·sun·b for the photometry sensor 9B and a light source adjustment value adj·sun·r for the photometry sensor 9R with respect to the value for G component are read from the EEPROM 26 (S142, S145). In the embodiment, the light source adjustment values are as follows.

$$adj\cdot sun\cdot b = +8$$

$$adj\cdot sun\cdot r = -4$$

It should be noted that, if the adjustment of the sensors 9 is executed using the sun light instead of the predetermined light source A, the light source adjustment values are all zero.

Then, based on the brightness data and the light source adjustment values, a light source compensation value light·gb for the photometry sensor 9B is obtained as follows (S143).

$$light\cdot gb = Bvd\cdot wb(0) - Bvd\cdot wb(1) + adj\cdot sun\cdot b$$

Similarly, a light source compensation value light·gr for the photometry sensor 9R is obtained as follows (S144).

$$light\cdot gr = Bvd\cdot wb(0) - Bvd\cdot wb(2) + adj\cdot sun\cdot r$$

FIG. 15 is a flowchart illustrating the "light source difference compensation procedure", which is called at S23 in FIG. 13. In this procedure, based on the light source compensation values for light·gb and light·gr, obtained at S22, the light source compensation is applied to the brightness values Bvd·b(i) and Bvd·r(i) (i=0–5) obtained at areas A0–A5 of the photometry sensors 9B and 9R, respectively.

At S151, for each photometry area of the photometry sensor 9B, the following calculation is executed.

$$Bvd\cdot b(i) = Bvd\cdot b(i) + light\cdot gb.$$

At S152, for each photometry area of the photometry sensor 9R, the following calculation is executed.

$$Bvd\cdot r(i) = Bvd\cdot r(i) + light\cdot gr.$$

With the above compensation, the photometry sensors 9G, 9B and 9R has the same photometric characteristics for the sun light.

The light source compensation will be described in further detail.

Figure 16A:
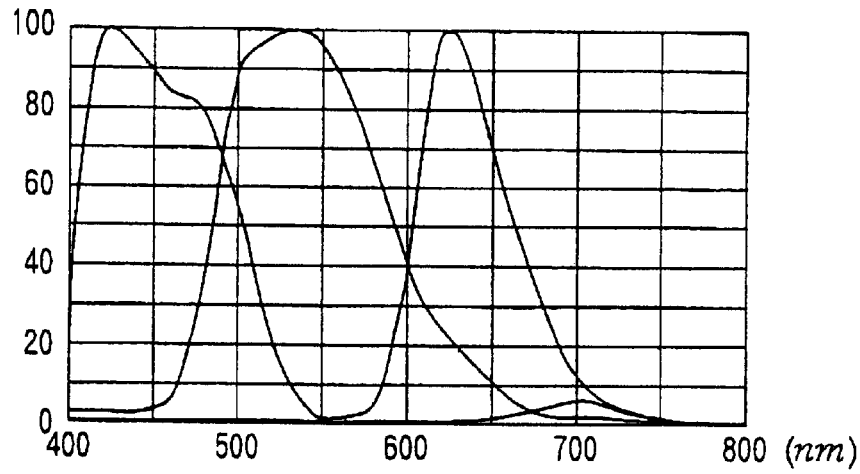
Figure 16B:
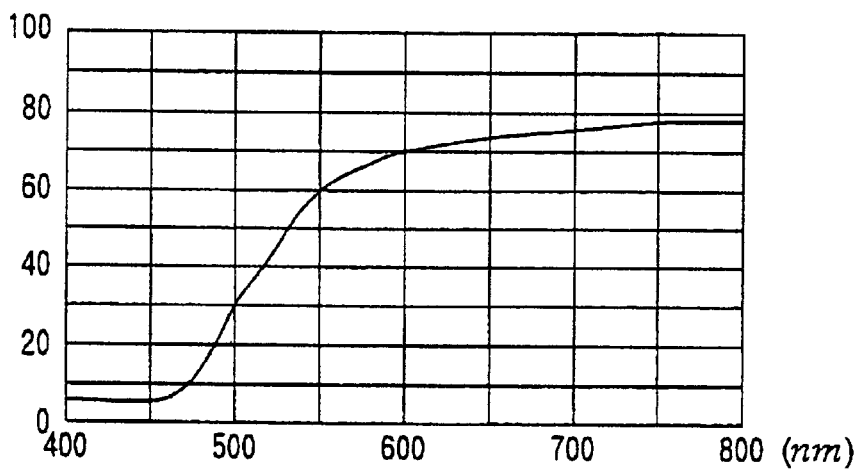
Figure 16C:
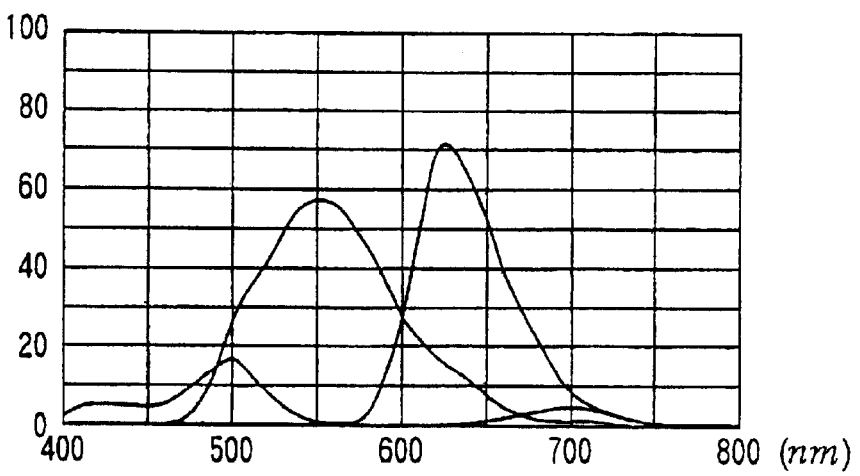

FIG. 16A shows an example of spectral sensitivity characteristics of the photometry sensors 9B, 9g and 9R. In the drawing, the characteristics are normalized, i.e., the peak of each characteristic is represented by 100. Given that the object color is yellow, then the spectral reflectivity may be represented by a curve indicated in FIG. 16B. If such an object is measured using the sensors 9B, 9G and 9R, the outputs are represented by curves shown in FIG. 16C. In FIG. 16C, since the output of the sensor 9B is low, the color is determined to be yellow in the colorimetry procedure.

Figure 16D:
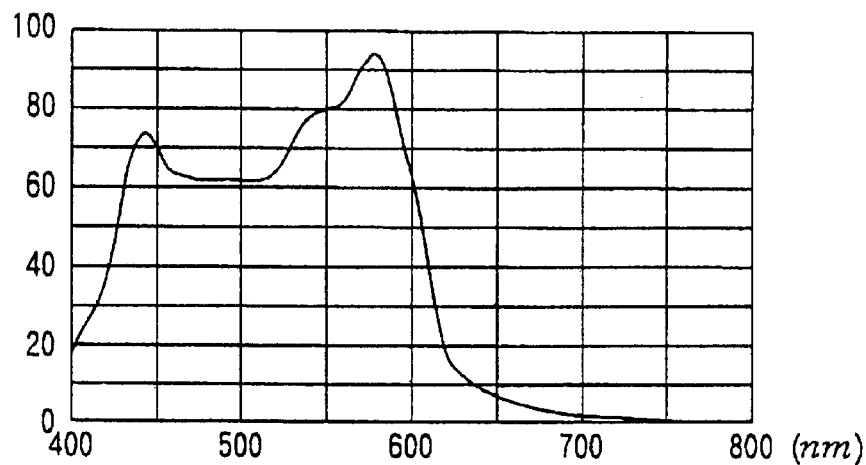

Next, it is assumed that a fluorescent lamp is used as a light source. FIG. 16D shows an example of the spectral radiant characteristic of the fluorescent lamp. If the fluorescent lamp is used for illuminating the same object, the outputs of the sensors 9B, 9G and 9R are represented by curves shown in FIG. 16E. In this example, only the output of the sensor 9G has a larger value than the other, the color of the object will be determined to be green in the colorimetry procedure, although the actual object color is yellow.

Figure 16E:
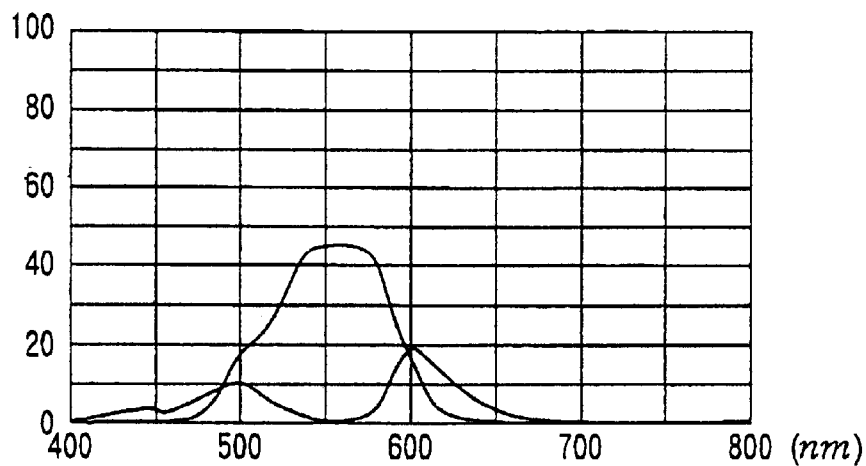
Figure 16F:
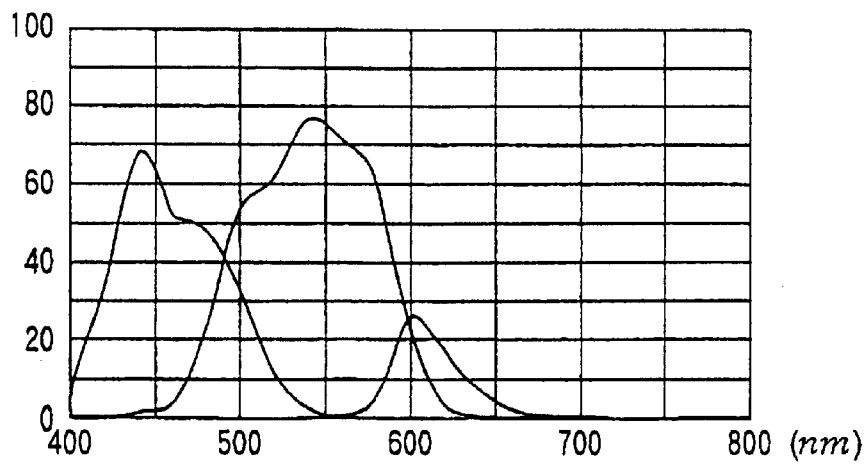

If the light source is measured using the sensor 12 which exhibits the spectral sensitivity characteristics similar to those shown in FIG. 16A, the outputs of the sensor 12 are represented by curves shown in FIG. 16F. If the outputs of the sensors 9B, 9G and 9R shown in FIG. 16E are compensated using the outputs of the sensor 12 shown in FIG. 16F, the compensated outputs will have the curves similar to those shown in FIG. 16C. That is, the affect of the color of the light source can be removed, and the colorimetry can be performed accurately.

FIG. 17 is a flowchart illustrating the "colorimetric parameter calculation procedure", which is called at S24 of FIG. 13. In this procedure, colorimetric parameters used in the colorimetric judging are calculated. As the colorimetric parameters, parameters $Gf(i)$ for G component, parameters $Bf(i)$ for B component, and parameters $Rf(i)$ for R component are calculated (S161, S162 and S163) according to the following formulae.

$$Gf(i)=Bvd\cdot g(i)-\{Bvd\cdot b(i)+Bvd\cdot r(i))/2;$$

$$Bf(i)=Bvd\cdot b(i)-\{Bvd\cdot g(i)+Bvd\cdot r(i))/2; \text{ and}$$

$$Rf(i)=Bvd\cdot r(i)-\{Bvd\cdot b(i)+Bvd\cdot g(i)\}\}/2.$$

FIG. 18 is a flowchart illustrating the colorimetric constant setting procedure, in which the colorimetric constants are read from the EEPROM 26. The colorimetric constants include:

threshold values for color judgment: THvalue·*1(i);
coefficients for color judgment; coefficient·#1(i) and coefficient·#2(i);
coefficients for calculating colorimetric compensation values; CCcoefficient·*1(i);
adjustment values for calculating the colorimetric compensation values: CCadjestment·*1(i).

In the above indication, a symbol*represents g (green), b (blue), r (red), m (magenta), y (yellow) or c (cyan), and a symbol # represents g (green), b (blue) or r (red). In this procedure, for all the photometry areas A0–A5 of the sensors 9, the colorimetric constants are set, respectively. Therefore, at S171, i is set to zero (0), and then, if i≦5 (S172:YES), the constants are read from the EEPROM (S173, S174, S175 and S176). Then, at S177, is incremented by one, and control returns to S172. Thus, for i=0 through 5, steps S173–S176 are repeated. The constants read from the EEPROM 26 are stored in the RAM 27 of the controller 20. FIG. 19 shows an example of the constants read from the EEPROM 26.

FIGS. 20 and 21 show a flowchart illustrating the "color judgment procedure". The procedure judges the color for each of the photometry areas A0–A5 of the photometry sensors 9G, 9B and 9R, and determines the color of the object for each photometry area A0–A5.

At S181, i is set to 0. Then, if i≦5 (S182:YES), the following steps are repeated. In the following description, Color(i) represents color parameters, Color·max(i) and Color·min(i) represent color judgment parameters, respectively.

At S183, the color parameter Color(i) is set to colorless. Then, at S184, Rf(i) and THvalue·1(i) are compared.

If Rf(i)<THvalue·1(i) (S184:YES), |Bf(i)−Gf(i)| and |coefficient·r1(i)×Rf(i)| are compared (S185).

If |Bf(i)−Gf(i)|<|coefficient·r1(i)×Rf(i)| (S185:YES), Color·min(i) is set to Rf(i) (S186).

If Rf(i)≧THvalue·c1(i) (S184:NO) or |Bf(i)−Gf(i)|≧|coefficient·r1(i)×Rf(i)| (S185:NO), step S186 is skipped.

At S187, Gf(i) is compared with THvalue·m1(i).

If Gf(i)<THvalue·m1(i) (S187:YES), |Bf(i)−Rf(i)| and |coefficient·g1(i)×Gf(i)| are compared (S188).

If |Bf(i)−Rf(i)|<|coefficient·g1(i)×Gf(i)| (S188:YES), Color·min(i) is set to Gf(i) (S189).

If Gf(i)>THvalue·m1(i) (S187:NO) or |Bf(i)−Rf(i)|≧|coefficient·g1(i)×Gf(i)| (S188:NO), step S189 is skipped.

At S190, Gf(i) is compared with THvalue·g1(i).

If Gf(i)>THvalue·g1(i) (S190:YES), |Bf(i)−Rf(i)| and |coefficient·g2(i)×Gf(i)| are compared (S191).

If |Bf(i)−Rf(i)|<|coefficient·g2(i)×Gf(i)| (S191:YES), Color·max(i) is set to Gf(i) (S192).

If Gf(i)≦THvalue·g1(i) (S190:NO) or |Bf(i)−Rf(i)|≧|coefficient·g2(i)×Gf(i)| (S191:NO), step S192 is skipped.

At S193, Bf(i) is compared with THvalue·b1(i).

If Bf(i)>THvalue·b1(i) (S193;YES), |Gf(i)−Rf(i)| and |coefficient·b2(i)×Bf(i)| are compared (S194).

If |Gf(i)−Rf(i)|<|coefficient·b2(i)×Bf(i)| (S194:YES), Color·max(i) is set to Bf(i) (S195). If Bf(i)≦THvalue·b1(i) (S193:NO) or |Gf(i)−Rf(i)|≧|coefficient·b2(i)×Bf(i)| (S194:NO), step S195 is skipped.

At S196, Rf(i) is compared with THvalue·r1(i).

If Rf(i)>THvalue·r1(i) (S196:YES), |Bf(i)−Gf(i)| and |coefficient·r2(i)×Rf(i)| are compared (S197).

If |Bf(i)−Gf(i)|<|coefficient·r2(i)×Rf(i)| (S197:YES), Color·max(i) is set to Rf(i) (S198). If Rf(i)≦THvalue·r1(i) (S196:NO) or |Bf(i)−Gf(i)|≧|coefficient·r2(i)×Rf(i)| (S197:NO), step S198 is skipped.

At S199, Bf(i) is compared with THvalue·y1(i).

If Bf(i)<THvalue·y1(i) (S199:YES), |Gf(i)−Rf(i)| and |coefficient·b1(i)×Bf(i)| are compared (S200).

If |Gf(i)−Rf(i)|<|coefficient·b1(i)×Bf(i)| (S200:YES), Color·min(i) is set to Bf(i) (S201). If Bf(i)>THvalue·y1(i) (S199:NO) or |Gf(i)−Rf(i)|≧|coefficient·b1(i)×Bf(i)| (S200:NO), step S201 is skipped.

During the above steps, for each of the photometry areas A0–A5, color·max(i) and color·min(i) are obtained.

At S202, color·min(i) and Rf(i) are compared. If color·min(i) is equal to Rf(i) (S202:YES), color(i) is set to cyan (S203). If color·min(i) is not equal to Rf(i), color·min (i) and Gf(i) are compared at S204. If color·min(i) is equal to Gf(i) (S204:YES) color(i) is set to magenta (S205). If color·min(i) is not equal to Gf(i), color·max(i) and Gf(i) are compared at S206. If color·max(i) is equal to Gf(i) (S206:YES), color(i) is set to green (S207). If color·max(i) is not equal to Gf(i) (S206:NO), then color·max(i) and Bf(i) are compared at S208. If color·max(i)is equal to Bf (i), color(i) is set to blue (S209). If color·max(i) is not equal to Bf(i) (S208:NO), then color·max(i) is compared with Rf(i) at S210. If color·max(i) is equal to Rf(i) (S210:YES), then color(i) is set to red (S211). If color·max(i) is not equal to Rf(i) (S210:NO), then color·min(i) is compared with Bf(i) at S212. If color·min(i) is equal to Bf(i) (S212:YES), color(i) is set to yellow (S213), and control proceeds to S214. If color·min(i) is not equal to Bf(i) (S212:NO), step S213 is skipped, and control proceeds to S214, where i is incremented by one. Then, control proceeds to S182. As a result of the above-described procedure, yellow has the highest priority, and in the foregoing steps, the color finally selected in accordance with the conditions is determined as the color of the photometry area.

FIG. 22 is a flowchart illustrating an example of the "area colorimetric compensation value calculating procedure", which is called at S27 of the colorimetry procedure in FIG. 13.

In this procedure, the colorimetric compensation values CC(i) corresponding to the difference of the color among the photometry areas are calculated. In the example shown in FIG. 22, the compensation values CC(i) are determined by selecting values from among predetermined values.

At S221, i is set to an initial value of zero. At S222, it is judged whether i is smaller than five. If i is 0, 1, 2, 3, 4 or 5, (S222:YES), it is judged whether color(i) is colorless (S223). If color(i) is colorless (S223:YES), CC(i) is set to zero (S224). If color(i) is not colorless (S223:NO), step S224 is skipped. At S225, it is judged whether color(i) is cyan. If color(i) is cyan (S225:YES), the colorimetric compensation value CC(i) is calculated as follows at S241.

$$CC(i)=CC\text{coefficient-}c1(i)\times\{Rf(i)-TH\text{value-}c1(i)\}+CC\text{adjustment-}c1(i).$$

If color(i) is not cyan (S225:NO), then step S241 is skipped. At S227, it is judged whether color(i) is magenta. If color(i) is magenta (S227:YES), the colorimetric compensation value CC(i) is calculated as follows at step S242.

$$CC(i)=CC\text{coefficient-}m1(i)\times\{Gf(i)-TH\text{value-}m1(i)\}+CC\text{adjustment-}m1(i).$$

If color(i) is not magenta (S227:NO), then step S242 is skipped. At S229, it is judged whether color(i) is green. If color(i) is green (S229:YES), the colorimetric compensation value CC(i) is calculated as follows at step S243.

$$CC(i)=CC\text{coefficient-}g1(i)\times\ddagger Gf(i)-TH\text{value-}g1(i))+CC\text{adjustment-}g1(i).$$

If color(i) is not green (S229:NO), then step S243 is skipped. At S231, it is judged whether color(i) is blue. If color(i) is blue (S231:YES), the colorimetric compensation value CC(i) is calculated as follows at step S244.

$$CC(i)=CC\text{coefficient-}b1(i)\times\{Bf(i)-TH\text{value-}b1(i)\}+CC\text{adjustment-}b1(i).$$

If color(i) is not blue (S231:NO), then step S244 is skipped. At S233, it is judged whether color(i) is red. If color(i) is red (S233:YES), the colorimetric compensation value CC(i) is calculated as follows at step S245.

$$CC(i)=CC\text{coefficient-}r1(i)\times\{Rf(i)-TH\text{value-}r1(i)\}+CC\text{adjustment-}r1(i).$$

If color(i) is not red (S233:NO), then step S245 is skipped. At S235, it is judged whether color(i) is yellow. If color(i) is yellow (S235:YES) the colorimetric compensation value CC(i) is calculated as follows at step S246.

$$CC(i)=CC\text{coefficient-}y1(i)\times\{Bf(i)-TH\text{value-}y1(i)\}+CC\text{adjustment-}y1(i)$$

If color(i) is not yellow (S235:NO), then step S246 is skipped. Then, at S237, i is incremented by one, and control returns to S222.

FIG. 23 is a flowchart illustrating a "CC calculating procedure", which is called at S28 of the colorimetry procedure in FIG. 13.

At S251, in accordance with the colorimetric compensation value CC(i) for each photometry area, a colorimetric compensation value CC for all of the photometry areas by averaging, center-weighted averaging, or adopting of the maximum value.

When the averaging is performed, the compensation value CC is calculated as follows.

$$CC=\{CC(0)+CC(1)+CC(2)+CC(3)+CC(4)+CC(5)\}/6$$

The center-weighted averaging is a weighted averaging procedure, in which the central area is weighted, and the compensation value CC is calculated as follows.

$$CC=\{CC(0)\times4+CC(5)+(CC(1)+CC(2)+CC(3)+CC(4)\times3/4)\}/8$$

When the maximum value is used as the compensation value CC, the compensation value CC is represented by the following formula.

$$CC=\max\{CC(0),CC(1),CC(2),CC(3),CC(4),CC(5)\}$$

As above, in the colorimetry procedure, the colorimetric compensation value CC can be obtained. Using the compensation value CC, the exposure value Lvd is compensated to obtain the final exposure value Lvd.

Then, in accordance with the exposure value Lvd, the exposure control device controls the exposure operation of the camera. With this configuration, regardless of the color of the object, in other words, regardless of the reflectivity of the object, an appropriate exposure value can always be obtained. In particular, when the object color is determined to be yellow, the exposure compensation value is determined to increase the exposure value, and when the object color is determined to be blue, the exposure compensation value is determined to decrease the exposure value. With this configuration, errors in determining the exposure value when such objects are photographed, which has been desired to be solved, can be resolved.

Further, since each photometry sensor is configured to have a plurality of photometry areas, and the exposure values and the compensation values are determined in accordance with the measured values at the plurality of photometry areas, an appropriate exposure compensation value can be determined when the entire object has a predetermined color, or when the object includes a plurality of portions having different colors.

Furthermore, in the above-described embodiment, the photometry sensor 12 is provided to measure the external light which illuminates the object, and the outputs of the photometry sensors 9B and 9R are compensated in accordance with the outputs of the photometry sensor 12. Therefore, the outputs of the photometry sensors 9G, 9B and 9R can well reflect the spectral reflectivity characteristics of the object regardless of the spectral radiant characteristic of the external light source. Therefore, the colorimetry can be performed accurately, and the compensation amount for the exposure value can be determined accurately.

It should be emphasized that, in the above-described embodiment, the photometry sensor 12, and the photometry sensors 9G, 9B and 9R utilize the same photo diodes, and the green, blue and red filters provided to the sensors 9G, 9B and 9R, and the filters provided to the areas A0–A2 of the photometry sensor 12 have the same spectral transmissivity characteristics. In other words, the photometry sensors 9G, 9B and 9R and the areas A0–A2 of the photometry sensor 12 have substantially the same spectral sensitivity characteristics. Therefore, the spectral differences between the outputs of the sensor 12 and the outputs of the sensors 9G, 9B and 9R can be substantially avoided, and the compensation related to the light source can be made at high accuracy. Accordingly, an appropriate exposure can be performed.

Figure 3B:
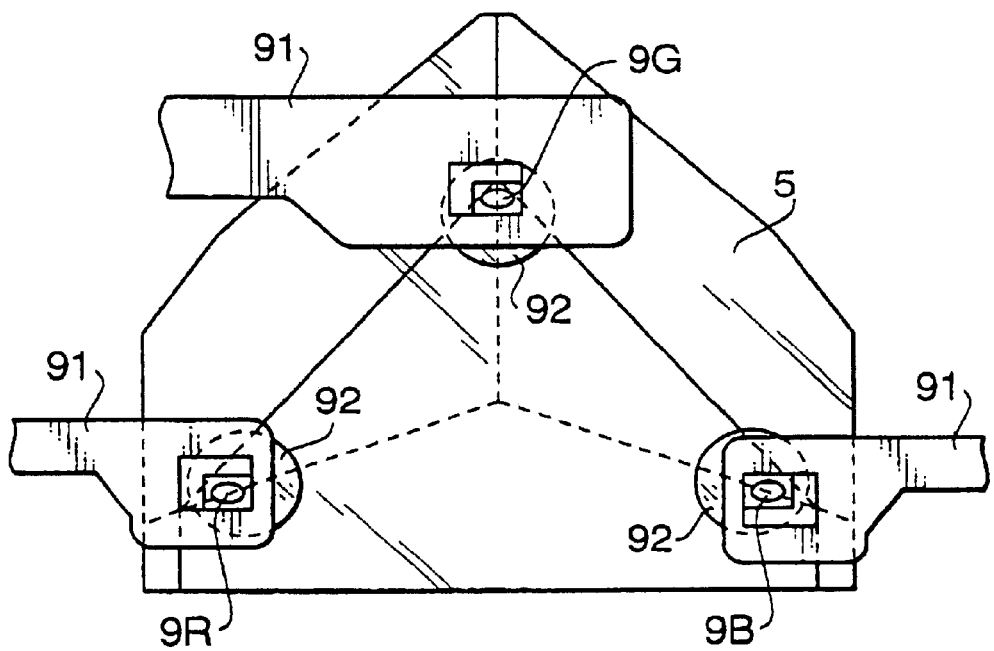
FIG. 3B shows an alternative arrangement of photometry sensors.

In the above-described embodiment, the sensor 9D for the normal light is provided in addition to the sensors 9B, 9G and 9R for B, G and R color components. The light receiving characteristics of the sensor G has a peak at the wavelength of 540 nm. This characteristic is close to that of the sensor 9D. Therefore, in another embodiment of the invention, the sensor 9G is used instead of the sensor 9D, and the sensor 9D is omitted, as shown in FIG. 3B. In such a case, in steps S11–S15 of the main procedure (FIG. 8), the output Bvad·g of the sensor 9G is used as Bvad, and the calculation is to be executed.

With such a structure, since the number of sensors is reduced, the manufacturing cost can be reduced. Further, a space necessary for arranging the sensors can be reduced, which enables downsizing of the camera body. In the case of FIG. 3B, since the sensor 9G is arranged at the upper central portion on the eyepiece optical system side of the pentagonal prism, photometry can be done accurately.

The present disclosure relates to the subject matters contained in japanese patent applications No. 2000-22230, filed on Jan. 31, 2000, and No. 2000-235355, filed on Aug. 3, 2000, which are expressly incorporated herein by reference in their entireties.

What is claimed is:

1. A photometry device for a camera, comprising:
   a normal light sensor having spectral sensitivity characteristics close to visual sensitivity characteristics;
   a plurality of colorimetric sensors having spectral sensitivity characteristics that are different from those of said normal light sensor;
   an exposure amount determining system that determines an exposure amount of an object in accordance with an output of said normal light sensor;
   a colorimetry system that judges a color of the object in accordance with the outputs of said plurality of colorimetric sensors;
   an external light sensor that measures an external light illuminating the object at spectral sensitivity characteristics corresponding to each of said plurality of colorimetric sensors, said colorimetry system judging the color of the object by compensating the outputs of said plurality of colorimetric sensors based on the outputs of said external light sensor;
   a compensation amount determining system that determines an exposure compensation amount in accordance with the color judged by said colorimetry system; and
   a controller that compensates for the exposure amount determined by said exposure amount determining system in accordance with the exposure compensation amount.

2. The photometry device according to claim 1, wherein said normal light sensor and said plurality of colorimetric sensors receive light which is reflected by the object and passed through a photographing optical system, which includes a photographing lens, of said camera, and wherein said external light sensor receives light which is reflected by the object and is not passed through said photographing optical system of said camera.

3. The photometry device according to claim 1,
   wherein said normal light sensor includes a normal light photometry sensor, the spectral sensitivity characteristic of which has a peak sensitivity at a wavelength within a range from 500 nm through 600 nm,
   wherein said plurality of colorimetric sensors include a blue light photometry sensor for metering blue light component, a green light photometry sensor for metering green light component, and a red light photometry sensor for metering red light component, and
   wherein said external light sensor includes a photometry sensor having photometry areas for metering blue, green and red light components, respectively.

4. The photometry device according to claim 3, wherein said plurality of colorimetric sensors and said normal light sensors include photometric elements having the same photometric characteristics.

5. The photometry device according to claim 3, wherein said external light sensor, said plurality of colorimetric sensors, and said normal light sensors include photometric elements having the same photometric characteristics.

6. The photometry device according to claim 5, wherein said blue light photometry sensor is provided with a blue filter, wherein said green light photometry sensor is provided with a green filter, wherein said red light photometry sensor is provided with a red filter, and wherein said external light sensor is provide with filters, whose spectral transmissivity characteristics are substantially the same as those of said blue, green and red filters, at said plurality of photometry areas, respectively.

7. The photometry device according to claim 6, wherein said normal light sensor, said plurality of colorimetric sensors and said external light sensor have substantially the same structure except said filters.

8. The photometry device according to claim 3, wherein, at the upper central portion of a pentagonal prism of said camera, said normal light sensor and said green light sensor are arranged side by side, wherein said blue light sensor and said red light sensor are arranged at right-and-left portions of said eyepiece optical system, and wherein said external light sensor is arranged on an upper front position of said pentagonal prism, said external light sensor facing a window formed on a body of said camera.

9. The photometry device according to claim 3, wherein said green light sensor doubles as said normal light sensor.

10. The photometry device according to claim 3, wherein said colorimetry system compensates for outputs of two of said colorimetric sensors in accordance with the outputs of said photometry areas of said external light sensor.

11. The photometry device according to claim 1, wherein said colorimetry system judges at least yellow, blue and red from among yellow, magenta, cyan, blue, green and red, in accordance with the outputs of said plurality of colorimetry sensors, and wherein said compensation amount determining system determines the exposure compensation amount in an over exposure side if the colorimetry system judges the color is yellow, and wherein said compensation amount determining system determines the exposure compensation amount in an under exposure side if the colorimetry system judges the color is blue or red.

12. The photometry device according to claim 11, wherein said compensation amount determining system determines the compensation amount is zero if the colorimetry system judges the color is magenta, cyan or green.

13. The photometry device according to claim 1, wherein each of said normal light sensor, and said plurality of colorimetry sensors has divided photometry areas, said exposure amount determining system and compensation amount determining system determining the exposure amount and the exposure compensation amount in accordance with the outputs of each of said divided photometry areas.

14. The photometry device according to claim 13, wherein said colorimetry system judges the color of the object at each of said divided photometry areas, and said compensation amount determining system determines the exposure compensation amount for each of said divided photometry areas.

15. The photometry device according to claim 13, wherein said exposure amount determining system determines an exposure compensation amount for the entire object by applying a predetermined calculation to the exposure compensation amounts obtained for said plurality of divided photometry areas.

* * * * *